(12) United States Patent
Qiu et al.

(10) Patent No.: US 7,586,931 B2
(45) Date of Patent: Sep. 8, 2009

(54) WIRELESS TERMINAL TURBO DECODING MODULE SUPPORTING PACKET SPLITTING AND DECODING

(75) Inventors: Xiaoxin Qiu, Bridgewater, NJ (US); Li Fung Chang, Holmdel, NJ (US); Hui Luo, Marlboro, NJ (US); Srirang Ashok Lovlekar, Iselin, NJ (US)

(73) Assignee: Broadcom Corporation, Irvine, CA (US)

( * ) Notice: Subject to any disclaimer, the term of this patent is extended or adjusted under 35 U.S.C. 154(b) by 214 days.

(21) Appl. No.: 11/779,988

(22) Filed: Jul. 19, 2007

(65) Prior Publication Data

US 2007/0280158 A1    Dec. 6, 2007

Related U.S. Application Data

(63) Continuation-in-part of application No. 11/142,213, filed on Jun. 1, 2005.

(51) Int. Cl.
*H04B 7/212* (2006.01)
(52) U.S. Cl. .................. 370/442; 370/479; 375/265; 714/792
(58) Field of Classification Search ............. 370/329, 370/335, 441, 442, 468, 479; 375/262, 265, 375/340, 341, 346, 348; 714/786, 792, 794, 714/795
See application file for complete search history.

(56) References Cited

U.S. PATENT DOCUMENTS

| | | | |
|---|---|---|---|
| 7,277,432 B2 * | 10/2007 | Liang et al. | 370/389 |
| 2003/0167394 A1 * | 9/2003 | Suzuki et al. | 713/168 |
| 2005/0047417 A1 * | 3/2005 | Lee et al. | 370/395.21 |
| 2005/0153735 A1 * | 7/2005 | Morioka et al. | 455/553.1 |
| 2005/0190719 A1 * | 9/2005 | Lee et al. | 370/328 |
| 2006/0056345 A1 * | 3/2006 | Marinier et al. | 370/329 |

* cited by examiner

*Primary Examiner*—Nhan T Le
(74) *Attorney, Agent, or Firm*—Garlick Harrison & Markison; Bruce E. Garlick

(57) ABSTRACT

A baseband processing module of a wireless terminal includes a Turbo decoding module. The Turbo decoding module decodes a Turbo code word to produce one or more Media Access Control (MAC) packet(s) carried by the turbo decode word. Each MAC packet includes a MAC packet header and the MAC packet payload, which carries one or more Radio Link Control (RLC) Packet Data Units (PDUs). The Turbo decoding module decodes the MAC packet header to determine boundaries of the PDUs carried in the MAC packet payload. The Turbo decoding module decodes RLC PDU headers and RLC PDU payloads of the RLC PDUs. The Turbo decoding module writes the decoded MAC packet header, the decoded RLC PDU headers, and the decoded RLC PDU payloads to memory in a word-aligned format. The Turbo decoding module may also operate in various other Turbo decoding modes.

33 Claims, 16 Drawing Sheets

WIRELESS TERMINAL TURBO DECODING MODULE SUPPORTING PACKET SPLITTING AND DECODING

CROSS REFERENCES TO RELATED APPLICATIONS

The present application is a continuation-in-part of U.S. Utility application Ser. No. 11/142,213, filed date of Jun. 1, 2005, and entitled: WIRELESS TERMINAL BASEBAND PROCESSOR HIGH SPEED TURBO DECODING MODULE SUPPORTING MAC HEADER SPLITTING, which is incorporated herein by reference in its entirety for all purposes.

BACKGROUND

1. Technical Field of the Invention

This invention relates generally to wireless communication systems, and more particularly to the receipt and decoding of data communications by a wireless terminal in such a wireless communication system.

2. Related Art

Mobile communication has changed the way people communicate and mobile phones have been transformed from a luxury item to an essential part of every day life. The use of mobile phones today is generally dictated by social situations, rather than being hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

The General Packet Radio Service (GPRS) and Enhanced Data rates for GSM (EDGE) technologies may be utilized for enhancing the data throughput of present second generation (2G) systems such as GSM. The GSM technology may support data rates of up to 14.4 kilobits per second (Kbps), while the GPRS technology may support data rates of up to 115 Kbps by allowing up to 8 data time slots per time division multiple access (TDMA) frame. The GSM technology, by contrast, may allow one data time slot per TDMA frame. The EDGE technology may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The High Speed Downlink Packet Access (HSDPA) technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology supports 16-level Quadrature Amplitude Modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbit/s to 1.8 Mbit/s with QPSK modulation and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles because of the very high-speed, wide bandwidth data transfers possible. For example, multiple-input multiple-output (MIMO) antenna architectures, and multipath processing receiver circuitry may be implemented to process the high speed, high bandwidth received RF signals to digital data. But, with the high speed, wide bandwidth access to, for example, the Internet, made possible by HSDPA, various protocol handlers at a mobile terminal may have problems in keeping up with the received packets.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
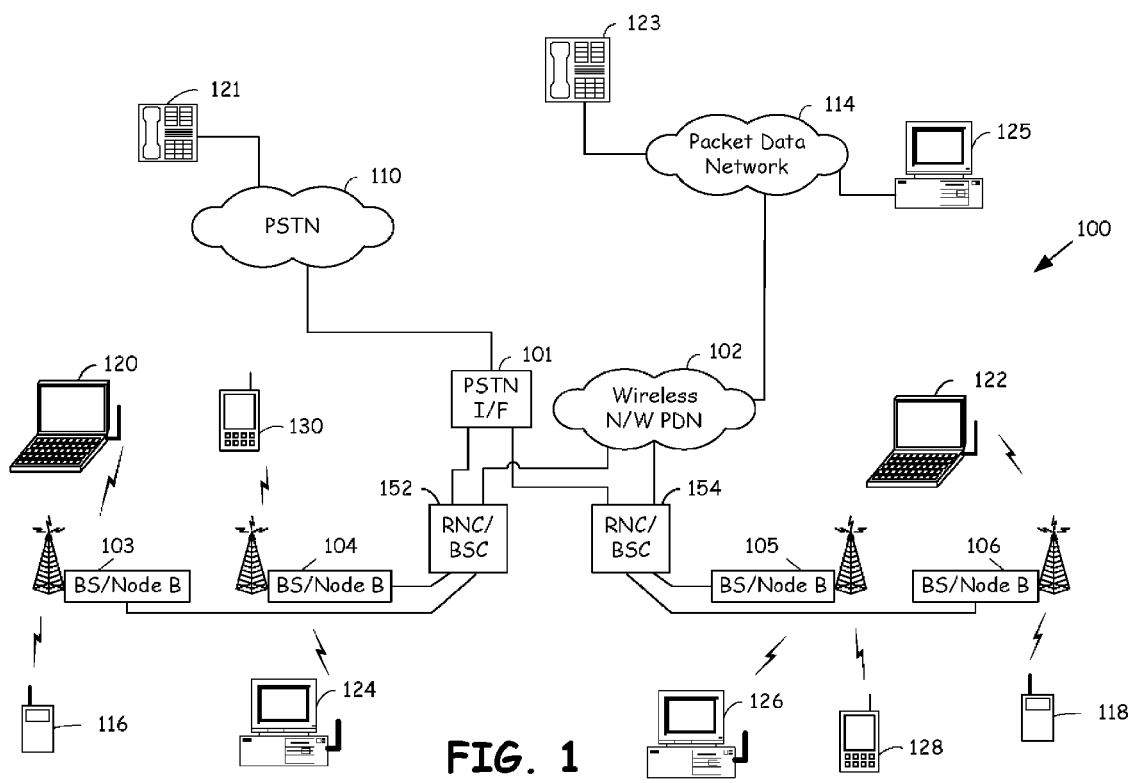
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Public Switched Telephone Network (PSTN) Interface 101, e.g., Mobile Switching Center, a wireless network packet data network 102 that includes GPRS Support Nodes, EDGE Support Nodes, WCDMA Support Nodes, and other components, Radio Network Controllers/Base Station Controllers (RNC/BSCs) 152 and 154, and base stations/node Bs 103, 104, 105, and 106. The wireless network packet data network 102 couples to additional private and public packet data networks 114, e.g., the Internet, WANs, LANs, etc. A conventional voice terminal 121 couples to the PSTN 110. Voice over Internet Protocol (VoIP) terminal 123 and a personal computer 125 couple to the Internet/WAN 114. The PSTN Interface 101 couples to the PSTN 110. Of course, this particular structure may vary from system to system.

Each of the base stations/node Bs 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, and/or various other CDMA standards, TDMA standards and/or FDMA standards, etc. This communication interface support includes the support of the High Speed Downlink Packet Access (HSDPA) operating standard, which will be described in detail herein. However, the reader should appreciate that principles and teachings of the present invention apply to other types of wireless interface operations, in addition to HSDPA operations.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard, the GPRS standard, the UMTS/WCDMA standards, other of the GSM standards and/or other wireless interface standards such as, for example, the various families of North American TDMA FDMA CDMA standards.

Figure 2:
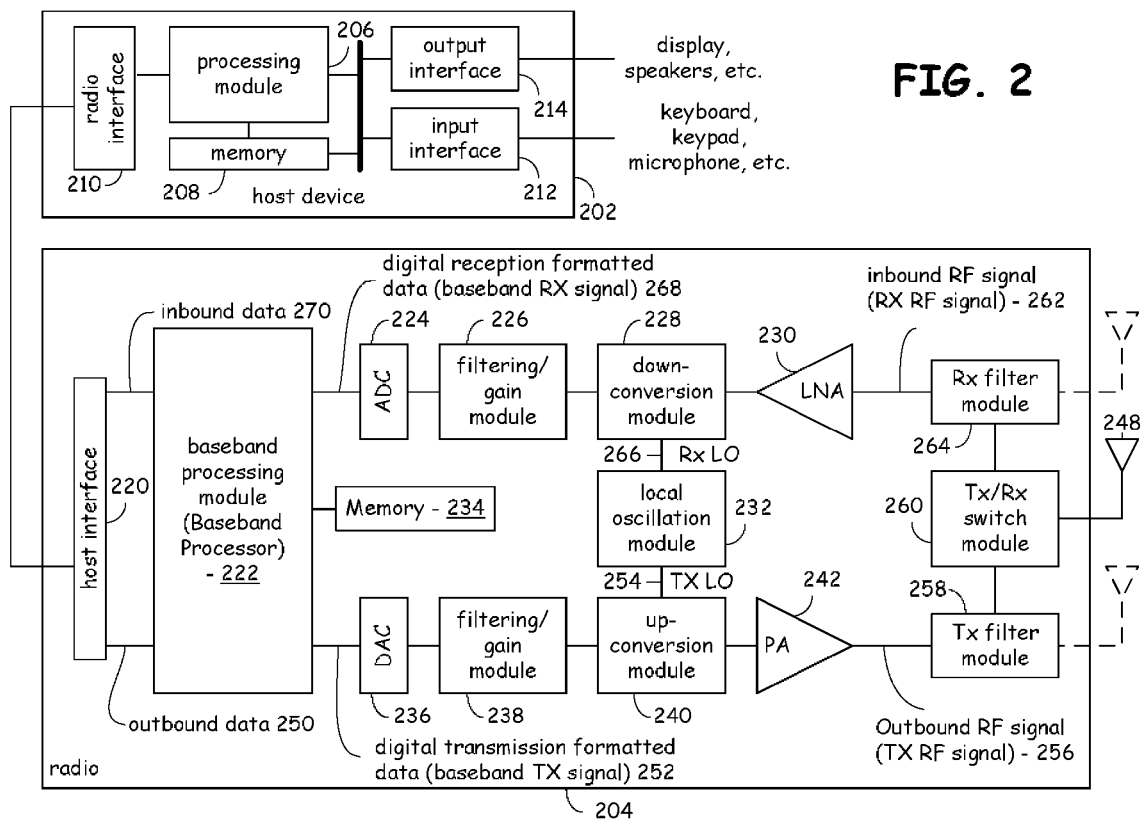
FIG. 2 is a block diagram functionally illustrating a wireless terminal constructed according to the present invention.

FIG. 2 is a schematic block diagram illustrating a wireless terminal that includes host processing components 202 and an associated radio 204. For cellular telephones, the host processing components and the radio 204 are contained within a single housing. In some cellular telephones, the host processing components 202 and some or all of the components of the radio 204 are formed on a single Integrated Circuit (IC). For personal digital assistants hosts, laptop hosts, and/or personal computer hosts, the radio 204 may reside within an expansion card and, therefore, reside be house separately from the host processing components 202. The host processing components 202 include at least a processing module 206, memory 208, radio interface 210, an input interface 212, and an output interface 214. The processing module 206 and memory 208 execute instructions to support host terminal functions. For example, for a cellular telephone host device, the processing module 206 performs user interface operations and executes host software programs among other operations.

The radio interface 210 allows data to be received from and sent to the radio 204. For data received from the radio 204 (e.g., inbound data), the radio interface 210 provides the data to the processing module 206 for further processing and/or routing to the output interface 214. The output interface 214 provides connectivity to an output display device such as a display, monitor, speakers, et cetera such that the received data may be displayed. The radio interface 210 also provides data from the processing module 206 to the radio 204. The processing module 206 may receive the outbound data from an input device such as a keyboard, keypad, microphone, et cetera via the input interface 212 or generate the data itself. For data received via the input interface 212, the processing module 206 may perform a corresponding host function on the data and/or route it to the radio 204 via the radio interface 210.

Radio 204 includes a host interface 220, baseband processing module (baseband processor) 222, analog-to-digital converter 224, filtering/gain module 226, down conversion module 228, low noise amplifier 230, local oscillation module 232, memory 234, digital-to-analog converter 236, filtering/gain module 238, up-conversion module 240, power amplifier 242, RX filter module 264, TX filter module 258, TN/RX switch module 260, and antenna 248. Antenna 248 may be a single antenna that is shared by transmit and receive paths (half-duplex) or may include separate antennas for the transmit path and receive path (full-duplex). The antenna implementation will depend on the particular standard to which the wireless communication device is compliant.

The baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling and/or decoding. The digital transmitter functions include, but are not limited to, encoding, scrambling, constellation mapping, modulation, and/or digital baseband to IF conversion. The transmit and receive functions provided by the baseband processing module 222 may be implemented using shared processing devices and/or individual processing devices. Processing devices may include microprocessors, microcontrollers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory 234 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 204 receives outbound data 250 from the host processing components via the host interface 220. The host interface 220 routes the outbound data 250 to the baseband processing module 222, which processes the outbound data 250 in accordance with a particular wireless communication standard (e.g., UMTS/WCDMA, GSM, GPRS, EDGE, HSDPA, et cetera) to produce digital transmission formatted data 252. The digital transmission formatted data 252 is a digital base-band signal or a digital low IF signal, where the low IF will be in the frequency range of zero to a few kilohertz/megahertz.

The digital-to-analog converter 236 converts the digital transmission formatted data 252 from the digital domain to the analog domain. The filtering/gain module 238 filters and/or adjusts the gain of the analog signal prior to providing it to the up-conversion module 240. The up-conversion module 240 directly converts the analog baseband or low IF signal into an RF signal based on a transmitter local oscillation 254 provided by local oscillation module 232. The power amplifier 242 amplifies the RF signal to produce outbound RF signal 256, which is filtered by the TX filter module 258. The TN/RX switch module 260 receives the amplified and filtered RF signal from the TX filter module 258 and provides the output RF signal 256 signal to the antenna 248, which transmits the outbound RF signal 256 to a targeted device such as a base station 103-106.

The radio 204 also receives an inbound RF signal 262, which was transmitted by a base station via the antenna 248, the TX/RX switch module 260, and the RX filter module 264. The low noise amplifier 230 receives inbound RF signal 262 and amplifies the inbound RF signal 262 to produce an amplified inbound RF signal. The low noise amplifier 230 provides the amplified inbound RF signal to the down conversion module 228, which converts the amplified inbound RF signal into an inbound low IF signal or baseband signal based on a receiver local oscillation 266 provided by local oscillation module 232. The down conversion module 228 provides the inbound low IF signal (or baseband signal) to the filtering/gain module 226, which filters and/or adjusts the gain of the signal before providing it to the analog to digital converter 224. The analog-to-digital converter 224 converts the filtered inbound low IF signal (or baseband signal) from the analog domain to the digital domain to produce digital reception formatted data 268. The baseband processing module 222 demodulates, demaps, descrambles, and/or decodes the digital reception formatted data 268 to recapture inbound data 270 in accordance with the particular wireless communication standard being implemented by radio 204. The host interface 220 provides the recaptured inbound data 270 to the host processing components 202 via the radio interface 210.

Figure 3:
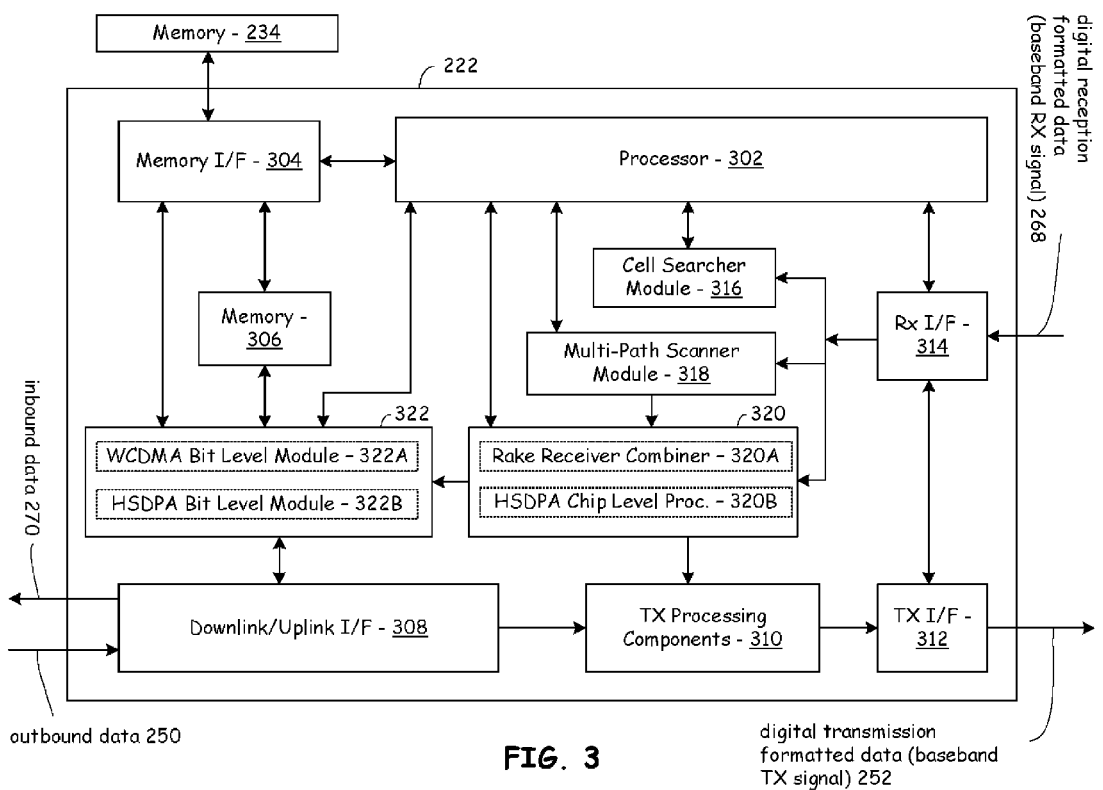
FIG. 3 is a block diagram illustrating components of a baseband processing module according to an embodiment of the present invention.

FIG. 3 is a block diagram illustrating components of a baseband processing module 222 according to an embodiment of the present invention. Components of baseband processing module (baseband processor) 222 include a processor 302, a memory interface 304, onboard memory 306, a downlink/uplink interface 308, TX processing components 310, and a TX interface 312. The baseband processing module 222 further includes an RX interface 314, a cell searcher module 316, a multi-path scanner module 318, a chip level processing module 320, and a bit level processing module 322.

The chip level processing module 320 includes a rake receiver combiner 320A that generally supports WCDMA receive processing operations and a HSDPA chip level processing module 320B that generally, supports HSDPA receive processing operations. The bit level processing module 322 includes a WCDMA bit-level processing module 322A that supports WCDMA bit-level operations and a HSDPA bit-level processing module 322B that supports HSDPA bit-level operations. The structure and operations of the HSDPA bit-level processing module 322B will be described further herein with reference to FIGS. 4-14.

The baseband processing module 222 couples in some embodiments to external memory 234. However, in other embodiments, memory 306 fulfills the memory requirements of the baseband processing module 302. According to some aspects of the present invention, memory 306 is cacheable while memory 234 is non-cacheable. Of course, in other embodiments, memory 234 may also be cacheable. As was previously described with reference to FIG. 2, the baseband processing module receives outbound data 250 from coupled host processing components 202 and provides inbound data 270 to the coupled host processing components 202. Further, the baseband processing module 222 provides digital formatted transmission data (baseband TX signal) 252 to a coupled RF front end. The baseband processing module 222 receives digital reception formatted data (baseband RX signal) 268 from the coupled RF front end. As was previously described with reference to FIG. 2, an ADC 222 produces the digital reception formatted data (baseband RX data) 268 while the DAC 236 of the RF front end receives the digital transmission formatted data (baseband TX signal) 252 from the baseband processing module 222.

According to one particular embodiment of the present invention, the downlink/uplink interface 308 is operable to receive the outbound data 250 from coupled host processing components, e.g., the host processing component 202 via host interface 220. Further, the downlink/uplink interface 308 is operable to provide inbound data 270 to the coupled host processing components 202 via the host interface 220. As the reader will appreciate, the baseband processing module 222 may be formed on a single integrated circuit with the other components of radio 204. Further, the radio 204 may be formed in a single integrated circuit along with the host processing components 202. Thus, in such case, all components of FIG. 2 excluding the antenna, display, speakers, et cetera and keyboard, keypad, microphone, et cetera may be formed on a single integrated circuit. However, in still other embodiments, the baseband processing module 222 and the host processing components 202 may be formed on a separate integrated circuit. Many differing integrated circuit constructs are possible without departing from the teachings of the present invention.

TX processing components 310 and TX interface 312 communicatively couple to the RF front end as illustrated in FIG. 2 and to the downlink/uplink interface 308. The TX processing components 310 and TX interface 312 are operable to receive the outbound data from the downlink/uplink interface 304, to process the outbound data to produce the baseband TX signal 252 and to output the baseband TX signal 252 to the RF front end as was described with reference to FIG. 2.

RX processing components including the cell searcher module 316, multi-path scanner module 318, chip level processing module 320, and in some cases the processor 302 are operable to receive the RX baseband signal 268 from the RF front end as processed by the RX I/F 314. Generally, the RX I/F 314 produces soft symbols representing the digital reception formatted data 268 in a format suitable for use by these components. The HSDPA chip level processing module 320B is operable to produce soft symbols output for use by the HSDPA decoding module 322B of the bit level processing module 322. The HSDPA bit level processing module 322B includes Hybrid Automatic Retransmission (HARQ) and IR processing components and Turbo decoding component. According to the present invention, the IR samples may form all or part of a received Turbo code word. As is generally, channel coding is used in an attempt to overcome less than perfect channel conditions. Coding operations include encoding information on the transmit side of a wireless link to produce a code word, e.g., a Turbo code word. This Turbo code word may be punctured and the punctured Turbo code word is then transmitted to the receiver. The receiver receives a version of the transmitted punctured Turbo code word that has been operated upon by a channel between the wireless transmitter and the wireless receiver. Upon receipt, this received Turbo code word is depunctured and then decoded. A successful decode of the Turbo code word yields the transmitted data.

With IR operations, a portion of a Turbo code word is transmitted from the transmitter to the receiver. If the receiver fails to successfully decode the Turbo code word, e.g., cyclical redundancy check (CRC) indicates errors, based upon the contents of received data, the transmitter will send another portion of the Turbo code word. The additional portion(s) of the Turbo code word transmitted may differ from the previous portion(s) of the Turbo code transmitted due to a different puncturing pattern, different coding rate, different data transmission rate, etc. In IR operations, a subsequent transmitted Turbo code word transmitted may be the same as a previously transmitted Turbo code word. In any case, according to the present invention, each of the initial and subsequent Turbo code words are received, combined, and turbo decoded. In many operations, a successful decoding of the (combined) Turbo code word results after combining and decoding multiple received transmissions carrying all or a portion of the Turbo code word.

According to some embodiments of the present invention, the bit level processing module 322 is operable to receive sets of IR samples from the memory 234 and/or 306, to combine the sets of IR samples representing all/portions to produce a Turbo code word, to decode the Turbo code word that it creates, and to determine whether the Turbo decoding operation was successful in error detection operations. In other embodiments, e.g., HSDPA operations, the bit level processing module 322 includes IR memory and performs IR processing operations without access of memory 234 and/or 306. When the Turbo decoding operations are successful, the Turbo decoding module 322 produces the inbound data 270 to the downlink uplink interface 308. Operations and structure of the bit level processing module 322 will be described further with reference to FIGS. 4-14. As contrasted to prior decoding operations within radio frequency transceivers, the bit level processing module 322 of the present invention offloads the processor 302 from its supported operations. While the decoding operations described particularly herein relate to Turbo decoding, the principles of the present invention apply equally to other types of decoding operations as well, such as convolutional coding, Low Density Parity Check (LDPC) coding, and other types of channel coding.

Figure 4:
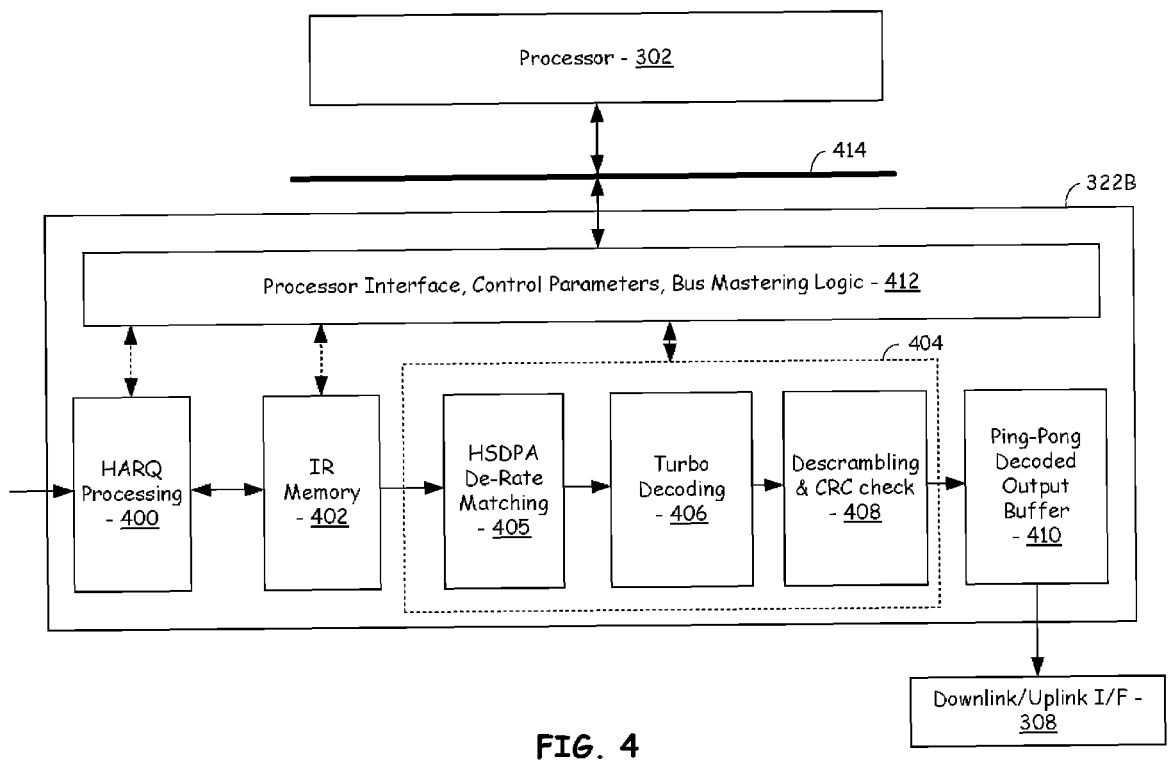
FIG. 4 is a block diagram illustrating components of a HSDPA bit-level processing module according to an embodiment of the present invention.

FIG. 4 is a block diagram illustrating components of a HSDPA bit-level processing module according to an embodiment of the present invention. With the embodiment of FIG. 4, the HSDPA bit-level processing module 322B supports HARQ processing which is a form of IR processing. The bit-level processing module 322B includes a HARQ processing module 400, IR memory 402, a HSDPA Turbo decoding module 404 and an output buffer 410 which may be a ping-pong decoded output buffer. The HARQ processing module 400 supports 16 QAM de-mapping, de-interleaving, $2^{nd}$ HSDPA de-rate matching and IR combining operations. The Turbo decoding module 404 supports de-rate matching processing 405, Turbo decoding 406, and descrambling and cyclical redundancy checking (CRC) 408. The output buffer 410 couples to downlinkuplink interface 308. The bit level processing module 322B further includes a processor interface, control parameters, and bus mastering logic 412 that couples to processor 302 via a processor bus 414. Each of the HARQ processing module 400, the IR memory 402, and the Turbo decoding module 404, couples to the processor interface, control parameters, and bus mastering logic component 412. The components of the HSDPA bit-level processing module 322B support the operations of the present invention subsequently described herein with reference to FIGS. 5A-14 as well as other operations.

FIGS. 5A, 5B, 5C, and 5D are block diagrams illustrating the manner in which Turbo code word(s) are decoded to produce a Media Access Control (MAC) Packet Data Unit (PDU) and the manner in which the MAC PDU is processed by a Turbo decoding module 404 according to embodiments of the present invention. The embodiments described with reference to FIGS. 5A-5D and subsequent FIGs. refer particularly to HSDPA operations. However, the reader should appreciate that these operations may be applied directly to other interface standards as well. Further, the MAC PDU may be referred to herein as MAC packet, MAC-HS packet, or otherwise interchangeably. The reader should appreciate that the principles of the present invention apply to many types of MAC packets and to other types of packets, other than MAC packets, as well that may be operated upon according to principles of the present invention.

Figure 5A:
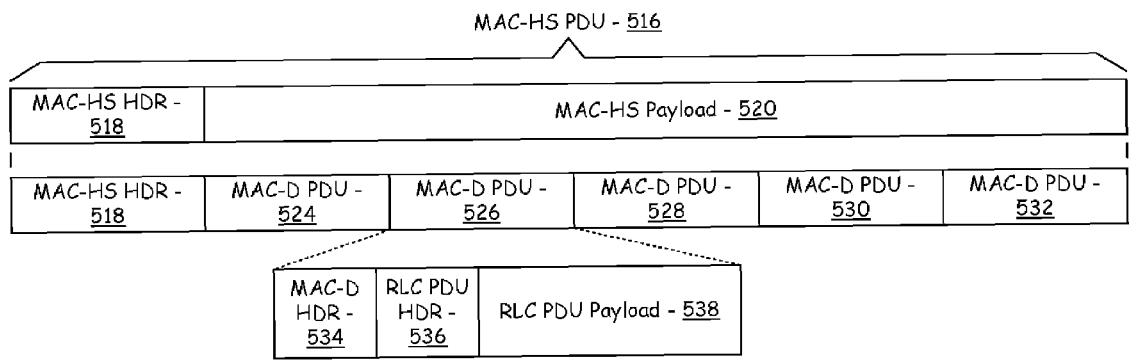
FIGS. 5A, 5B, 5C, and 5D are block diagrams illustrating the manner in which Turbo code word(s) are decoded to produce a Media Access Control (MAC) packet and the manner in which the MAC packet is processed by a Turbo decoding module according to embodiments of the present invention.

Referring particularly to FIG. 5A, a MAC-HS PDU 516 includes a MAC-HS header (HDR) 518 and a MAC-HS payload 520. The MAC-HS payload 520 carries a plurality of MAC-D PDUs 524-532. Each MAC-D PDU 524-532 may include a MAC-D HDR (typically 4 bits) 534 and a MAC-D payload that carries a portion of, one, or more than one RLC PDU. Each RLC PDU includes an RLC PDU HDR 536 and an RLC PDU payload 538. For ease in description, FIG. 5A illustrates that each MAC-D payload carries a single RLC PDU. One or more RLC PDUs may form an RLC Service Data Unit (SDU). Each RLC PDU may carry a portion of a single SDU or portions of multiple SDUs. It is desired that the MAC-HS PDU 516 be successfully transmitted from the transmitter, e.g., base station, to the receiver, e.g., wireless terminal. Each MAC-HS PDU 516 may be carried by a single Turbo code word, multiple Turbo code words, or a portion of a Turbo code word.

Figure 5B:
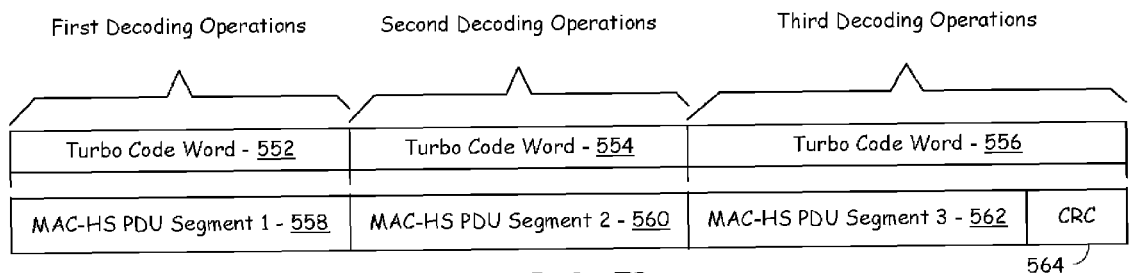

Referring particularly to FIG. 5B, on the transmit side, the MAC-HS PDU 516 may be segmented into a plurality of, e.g., three, MAC-HS PDU segments 558, 560, and 562. Appended to the MAC-HS PDU segments 558, 560, and 562, is a cyclical redundancy check 564. The transmitter forms Turbo code words 552, 554, and 556 to carry the MAC-HS PDU segments 558, 560, and 562 and the CRC 564. For example, Turbo code word 552 carries MAC-HS PDU segment 1—558, Turbo code word 554 carries MAC-HS PDU segment 2—560 and Turbo code word 556 carries MAC-HS PDU segment 3—562 and CRC 564. The Turbo code words 552-556 are transmitted (fully or in a punctured format) from the transmitter to the receiver. The Turbo decoding module 404 of the present invention receives and operates upon the Turbo code words 552-556. After Turbo decoding operations are completed on the Turbo code words 552-556, the Turbo decoding module performs error checking operations using the CRC 564. A successful error checking operation yields the MAC-HS PDU 516 at the receiver. An unsuccessful error checking operation results in additional HARQ operations for the Turbo code words 552-556.

Figure 5C:
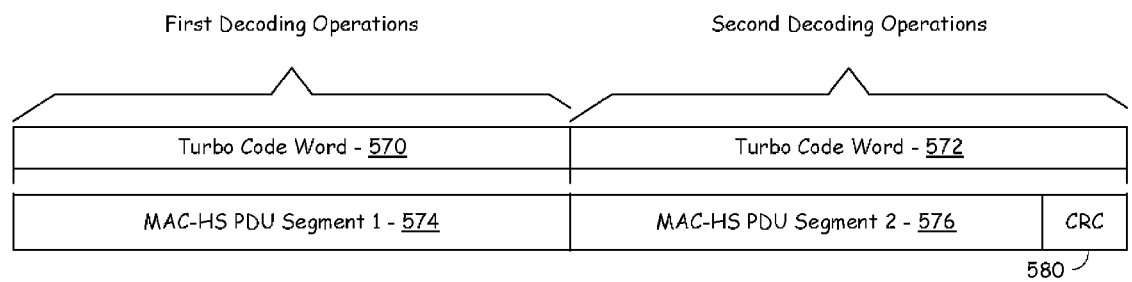

Referring particularly to FIG. 5C, on the transmit side, the MAC-HS PDU 516 may alternately be segmented into two MAC-HS PDU segments 574 and 576. Appended to the MAC-HS PDU segments 574 and 576 is a cyclical redundancy check 580. The transmitter forms Turbo code words 570 and 572 to carry the MAC-HS PDUs 574 and 576 and the CRC 580. The Turbo code words 570 and 572 are transmitted from the transmitter and received by the receiver. The Turbo decoding module 404 of the present invention receives and operates upon each of the Turbo code words 570 and 572 separately. After Turbo decoding operations are completed on the Turbo code words 570 and 572, the Turbo decoding module performs error checking operations using the CRC 580. A successful error checking operation yields the MAC-HS PDU 516 at the receiver. An unsuccessful error checking operation results in additional ARQ operations for the Turbo code words 570 and 572.

Figure 5D:
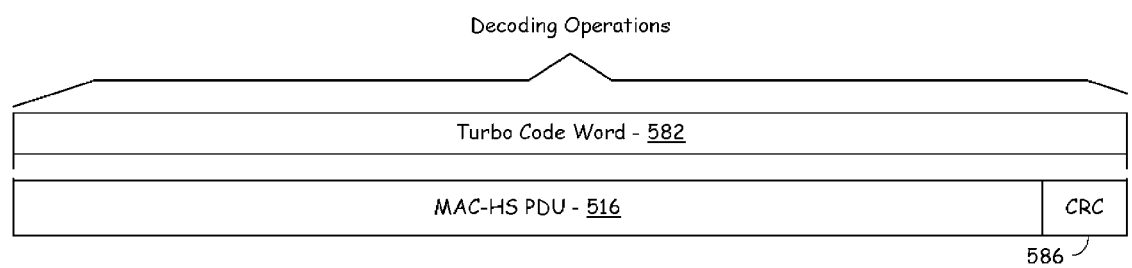

Now, referring particularly to FIG. 5D, on the transmit side, the MAC-HS PDU 516 may have appended thereto a cyclical redundancy check 586 and be carried by a single Turbo code word 582. The Turbo code word 582 is transmitted from the transmitter and received by the receiver. The Turbo decoding module 404 of the present invention receives and operates upon the Turbo code word 582. After Turbo decoding operations are completed on the Turbo code word 582, the Turbo decoding module performs error checking operations on the received MAC-HS PDU 516 using the CRC 586. A successful error checking operation yields the MAC-HS PDU 516 at the receiver. An unsuccessful error checking operation results in additional HARQ operations for the Turbo code word 582. According to another embodiment of the present invention (not shown), a Turbo code word carries multiple MAC-HS packets.

Referring to FIGS. 5A-5D, according to an aspect to the present invention, the Turbo decoding module 404 not only is operable to decode Turbo code words 552, 554, 556, 570, 572, and 584 but is also operable to examine and decode the contents of the MAC-HS PDU 516. A first operation of this type includes extracting and decoding the MAC-HS HDR 518. Based upon this decoding operation, the Turbo decoding module 404 is operable to determine the boundaries of MAC-D PDUs 524, 526, 528, 530, 530, and 532 carried by the MAC-HS payload 520. In further operations the Turbo decoding module 404 is operable to extract and decode the MAC-D HDRs, e.g., 534. In still further operations, the Turbo decoding module 322 is operable to extract the RLC PDU HDRs, e.g., 536, and RLC PDU payloads, e.g., 538 carried by the MAC-D payloads.

As will be described further herein with reference to FIGS. 6-14, the Turbo decoding module 404 (HSDPA Turbo decoding module) supports operation in a number of differing modes. Based upon its particular mode of operation, the Turbo decoding module 404 operates upon the MAC-HS PDU 514 and writes output to memory in differing manners. In a first mode of operation, mode 1, the Turbo decoding module 404, after successfully decoding a turbo decode word simply writes the decoded Turbo code to memory in a bit format without operating upon the carried MAC-HS PDU 514 (or portion thereof).

In a second mode of operation, mode 2, the Turbo decoding module 404 separately writes the MAC-HS HDR 518 to first memory and the MAC-HS payload 520 to a second memory.

In a third mode of operation, mode 3, the Turbo decoding module 404 decodes the MAC-HS HDR and writes the decoded MAC-HS HDR to memory in a word aligned format. In mode 3, the Turbo decoding module separately writes the MAC-HS payload and the MAC-D HDRs 534 when present to other memory. Further, in mode 3, the Turbo decoding module writes the MAC-D payloads, which include one or more RLC PDUs to memory as well. All of these components may be written in a word aligned format.

Finally, in a fourth mode of operation, mode 4, the Turbo decoding module 404 is first operable to extract and decode the MAC-HS HDR 518. Then, based upon the decoded MAC-HS HDR 518, the Turbo decoding module is operable to extract the MAC-D PDUs and to extract the MAC-D HDRs 534 when present. Further, the Turbo decoding module, in mode 4 is operable to extract the RLC PDU HDRs 536 and the RLC PDU payloads 538 and to write all of this extracted data to memory in a 32-bit (or other length) aligned word format.

Thus, as compared to prior systems in which the processor 302 was required to perform error checking operations upon the MAC-HS packet 516 and to segregate and decode the MAC-HS packet 516 into its carried components, the Turbo decoding module 404 of the present invention performs such error checking and/or MAC-HS packet segregation and decoding.

Figure 6:
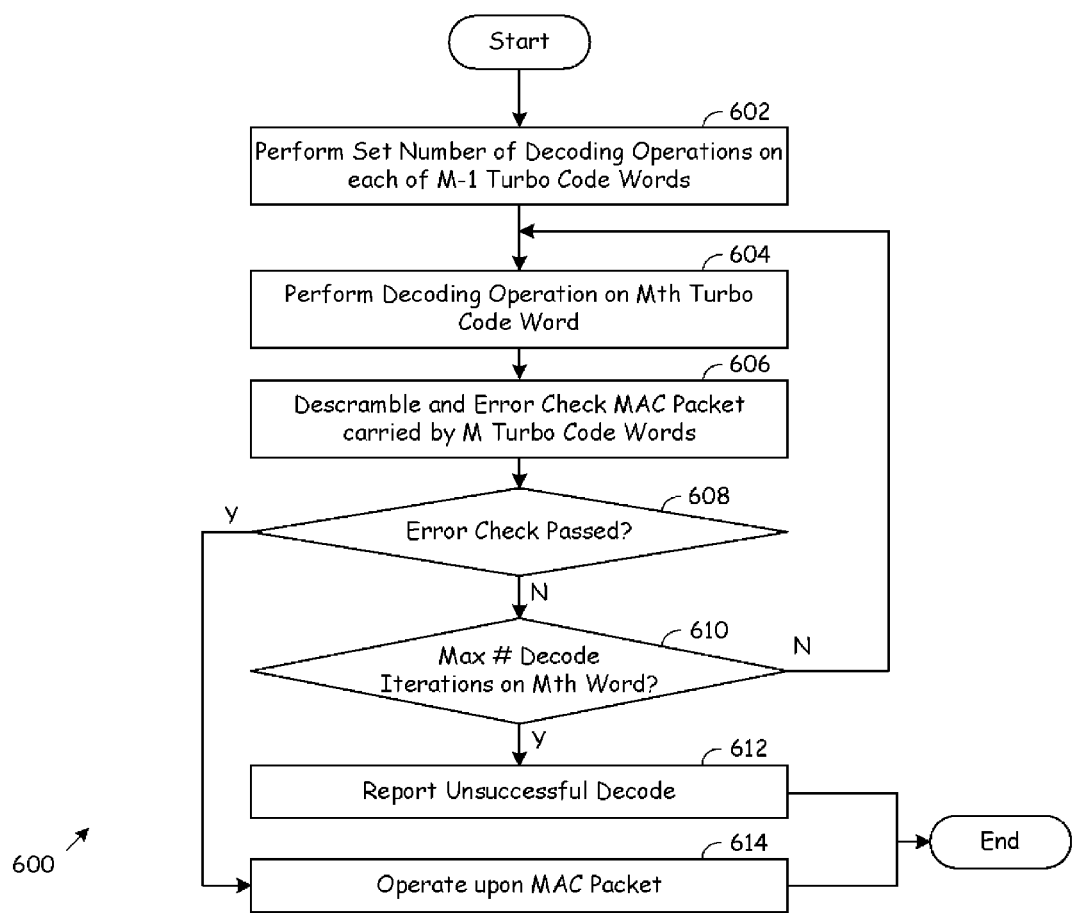
FIG. 6 is a flow chart illustrating operations for decoding multiple Turbo code words that jointly carry a MAC packet according to an embodiment of the present invention.

FIG. 6 is a flow chart illustrating operations for decoding multiple Turbo code words that jointly carry a MAC packet according to an embodiment of the present invention. According to the general principles of this aspect to the present invention, the Turbo decoding module performs a predetermined number of decoding operations on a subject Turbo code only when required.

When the MAC packet is carried by multiple Turbo code cords, the Turbo decoding module may perform different decoding operations on the last Turbo code word as compared to the decoding operations for each of the previous Turbo code words. When the MAC packet is carried by a single Turbo code word, fewer Turbo decoding operations than a predetermined number of Turbo decoding operations are performed on the Turbo code word when the MAC packet is produced error free.

For the situation in which the MAC packet is carried by multiple Turbo code words, operations 600 require performing a predetermined number of decoding operations on each of the first M-1 Turbo code words (Step 602) and one or more decoding operations on the Mth Turbo code word (Steps 604-610). M may be any integer 2 or greater according to this particular aspect to the present invention. For example, referring to FIGS. 5B and 6, when a MAC PDU 516 is formed of three Turbo code words 552, 554, and 556, operations of Step 602 will include performing a set number of Turbo decoding operations on both the first Turbo code word 552 and the second Turbo code word 554. Then, operation proceeds with the Turbo code module performing a first decoding operation on the third Turbo code word 556 (Step 604). Then, the Turbo decoding module descrambles and error checks the MAC packet that is carried by the three (M) Turbo code words 552, 554, and 556 (Step 606). If the error check operations pass (as determined at Step 608) the Turbo decoding module operates upon the MAC packet (Step 614). However, if the initial Turbo decoding operation performed on the third (Mth) Turbo code word did not pass the error check operation at Step 608, operation proceeds to Step 610 where it is determined whether the third (Mth) Turbo code word has been decoded a predetermined number of times. If a predetermined number of decoding iterations on the third (Mth) Turbo code word has not been performed, operation returns to Step 604 where an additional Turbo decoding operation on the third (Mth) Turbo code word is performed. After the predetermined number of decoding iterations on the third (Mth) Turbo code word have been performed, operation proceeds to Step 612 wherein an unsuccessful decoding is reported.

Figure 12:
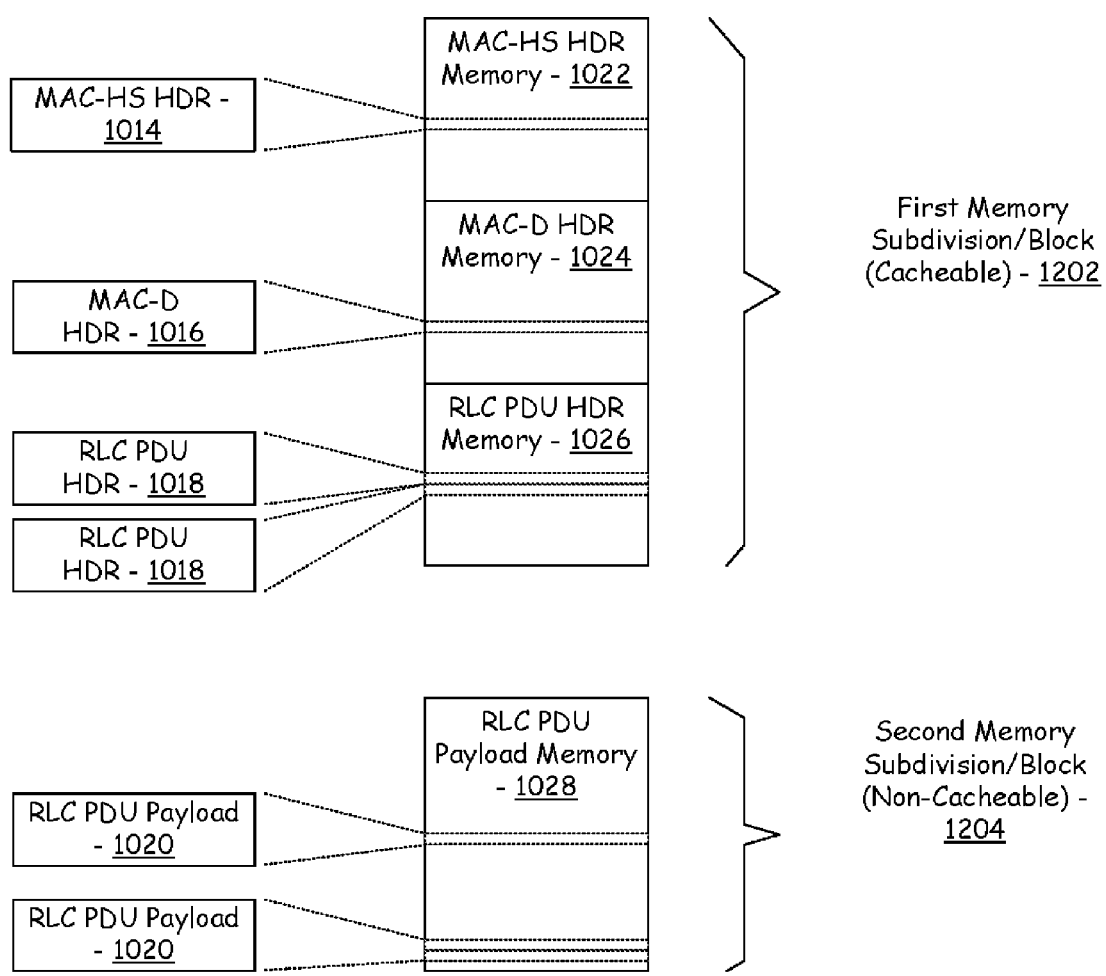
FIG. 12 is a block diagram illustrating an embodiment for writing decoded MAC-HS headers, extracted MAC-D headers, extracted RLC PDU headers, and the RLC PDU payloads to memory according to the present invention.

These teachings of the present invention as illustrated in FIG. 6 may applied to differing numbers of Turbo code words forming the MAC packet, as well. For example, when M=2, as illustrated in FIG. 5C, step 602 is performed on the first Turbo code word. Further, when M=1, as illustrated in FIG. 5D, step 602 is not performed while the remainder of the steps of FIG. 12 are performed on the single Turbo code word. The operations 600 of FIG. 12 therefore yield efficiencies in that a reduced number of decoding operations on one (Mth) Turbo code, in many cases of multiple Turbo code words that carries the MAC packet. Thus, for example, when the predetermined number of decoding operations is eight (8) decoding operations and a successful decoding requires less than 8 decoding operations, efficiencies including reduced latency and reduced resource usage result.

Figure 7:
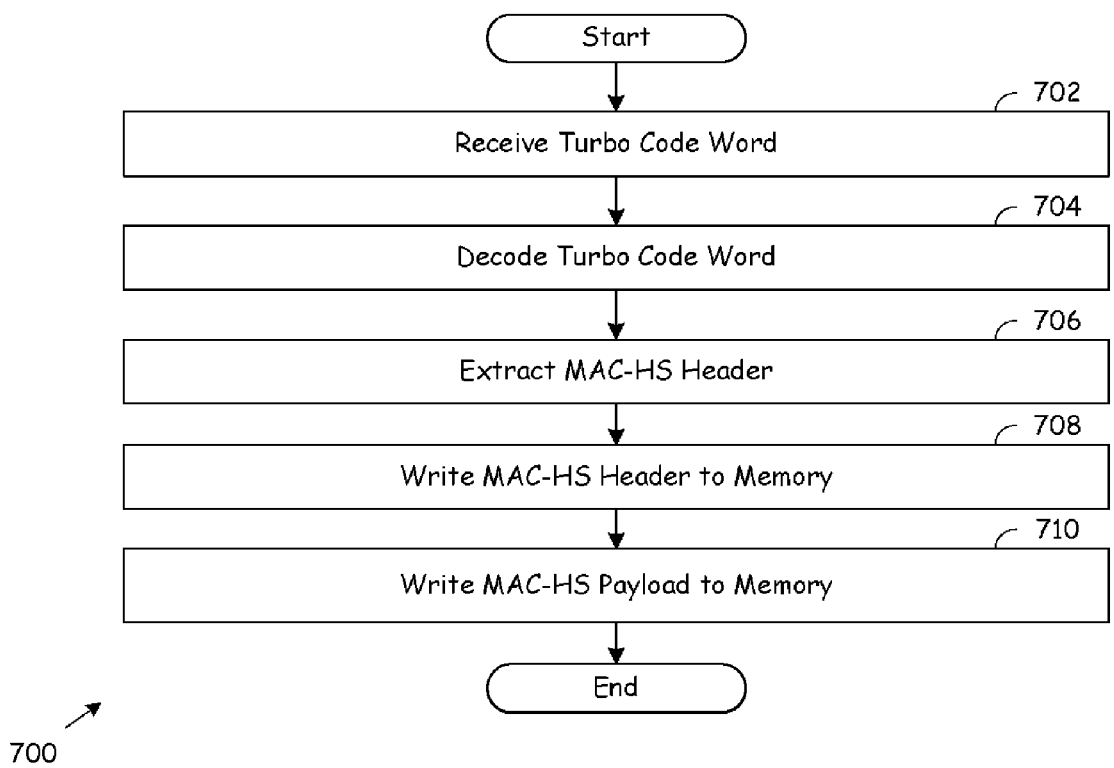
FIG. 7 is a flow chart illustrating operations for processing a MAC packet by a Turbo decoding module according to an embodiment of the present invention.

FIG. 7 is a flow chart illustrating operations for processing a MAC packet by a Turbo decoding module according to an embodiment of the present invention. The structure of the MAC packet in relationship to Turbo code words was previously described with reference to FIGS. 5A-5D. The operations 700 of FIG. 7 correspond to mode 2 referenced above (second mode of operation) and commence with the Turbo decoding module receiving a Turbo code word (Step 702) and decoding the Turbo code word to produce a MAC packet, e.g., MAC-HS PDU (Step 704). In producing the MAC-HS PDU, Steps 702 and 704 may have to be repeated a number of times to produce the MAC-HS PDU. Operation continues with the Turbo decoding module extracting the MAC-HS HDR (Step 706). The Turbo decoding module writes the extracted MAC-HS HDR to memory (Step 708). Finally, the Turbo decoding module writes the MAC-HS payload to memory (Step 710). From Step 710 operation ends. In writing the MAC-HS HDR and the MAC-HS payload, the Turbo decoding module may write these components in a word-aligned format. For example, using 32 bit word memory, the MAC-HS HDR is written beginning with a first memory location. If the MAC-HS HDR is longer than 32 bits, it may require two (or more) memory locations. Likewise, the MAC-HS payload is written beginning with another memory location and may occupy multiple 32 bit memory locations. The manner in which the MAC-HS HDR and the MAC-HS payloads are written to memory according to this mode 2 will be described further with reference to FIG. 1A.

Figure 8:
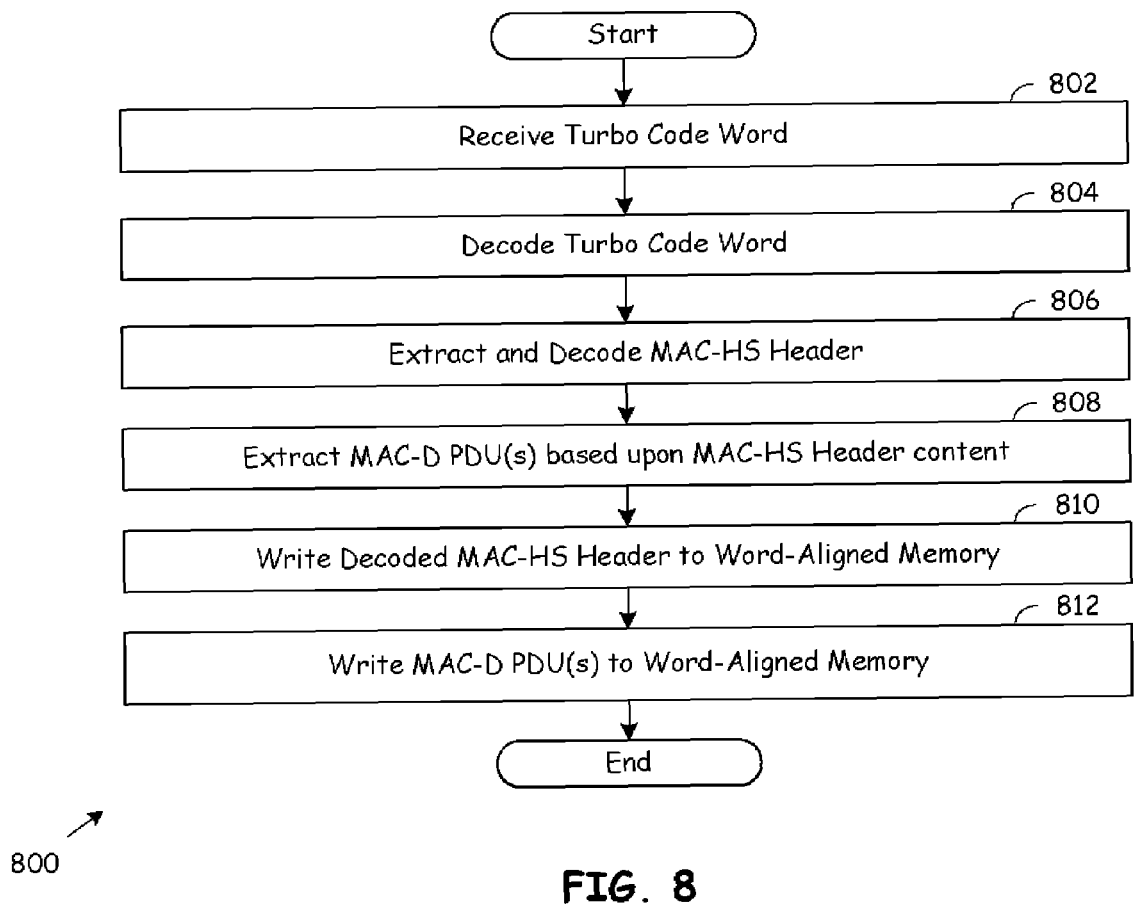
FIG. 8 is a flow chart illustrating operations for processing a MAC-HS packet by a Turbo decoding module according to another embodiment of the present invention.

FIG. 8 is a flow chart illustrating operations for processing a MAC-HS packet by a Turbo decoding module according to another embodiment of the present invention. The structure of the MAC-HS packet in relationship to Turbo code words was previously described with reference to FIGS. 5A-5D. The operations 800 of FIG. 8 correspond to the third mode of operation, mode 3, previously described above and commence with the Turbo decoding module receiving a Turbo code word (Step 802) and decoding the Turbo code word to produce a MAC packet, e.g., MAC-HS PDU (Step 804). In producing the MAC-HS PDU, Steps 802 and 804 may have to be repeated a number of times to produce the MAC-HS PDU. Operation continues with the Turbo decoding module extracting and decoding the MAC-HS HDR (Step 806). Then, based upon the MAC-HS HDR content, the Turbo decoding module extracts one or more MAC-D PDUs, e.g., 524-532 carried by the MAC-HS payload 520 (Step 808). The Turbo decoding module then writes the decoded MAC-HS HDR to memory in a word-aligned format (Step 810). Finally, the Turbo decoding module writes the MAC-D PDU payloads to memory in a word-aligned format (Step 810). Generally, each MAC-D PDU will be written starting in a new 32 bit memory location. Because some of the MAC-D PDUs may be longer than 32 bits, they may occupy more than one memory location. From Step 810 operation ends.

The operation 800 of FIG. 8 could also include the Turbo decoding module extracting MAC-D HDRs carried by the MAC-D PDUs. In such case, step 808 would include separating the MAC-D HDRs from the MAC-D payloads based upon the MAC-HS HDR content and Step 812 would include writing the MAC-D HDRs and MAC-D payloads separately to memory in a word-aligned format. The operation of Step 810 may include writing the decoded MAC-HS HDRs to a first memory subdivision and writing the MAC-D PDUs to a second memory subdivision. An example of this operation will be described with reference to FIG. 11B.

Figure 9:
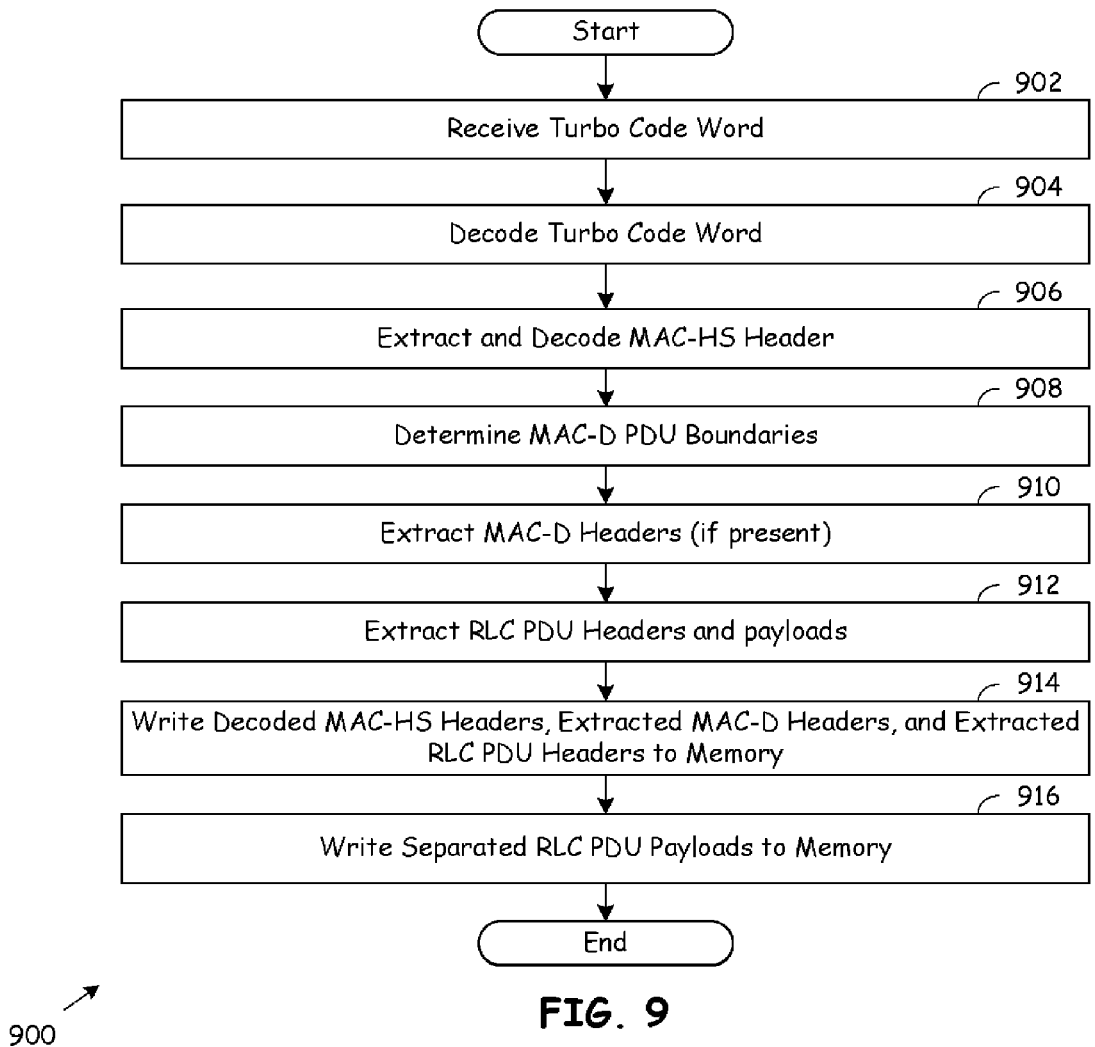
FIG. 9 is a flow chart illustrating operations for processing a MAC packet by a Turbo decoding module according to still another embodiment of the present invention.

FIG. 9 is a flow chart illustrating operations for processing a MAC packet by a Turbo decoding module according to still another embodiment of the present invention. The structure of the MAC packet in relationship to Turbo code words was previously described with reference to FIGS. 5A-5D. The operations 900 of FIG. 9 correspond to mode 4 referenced above and commence with the Turbo decoding module receiving a Turbo code word (Step 902) and decoding the Turbo code word to produce a MAC packet, e.g., MAC-HS PDU (Step 904). In producing the MAC-HS PDU, Steps 902 and 904 may have to be repeated a number of times to produce the MAC-HS PDU.

Operation continues with the Turbo decoding module extracting and decoding the MAC-HS HDR (Step 906). The Turbo decoding module then, based upon the decoded MAC-HS HDR, determines the boundaries of a plurality of MAC-D PDUs carried by the MAC-HS payload and which, if any, of the MAC-D PDUs include MAC-D HDRs (Step 908). The Turbo decoding module then extracts the MAC-D HDRs from the MAC-D PDUs if present (Step 910). Note that not every MAC-D PDU carries a MAC-D PDU HDR and that step 910 is performed only for the MAC-D PDUs that carry such a HDR. The Turbo decoding module then extracts the RLC PDU HDRs and RLC PDU payloads from the MAC-D payloads (Step 912).

Operation continues with the Turbo decoding module writing the decoded MAC-HS HDR, the MAC-D PDU HDRs, and the RLC PDU HDRs to memory in a word-aligned format (Step 914). Finally, the Turbo decoding module writes the RLC PDU payloads to memory in a word-aligned format (Step 916). From Step 916 operation ends.

The reader should appreciate that the operations 900 of FIG. 9 and/or the operations 800 of FIG. 8 may also be performed with the Turbo code word carrying multiple MAC-HS PDU or a portion of a MAC-HS PDU. The reader should also understand that decoding of the Turbo code word at Step 904 (Step 804) includes determining whether the Turbo code word has been successfully decoded. Such determination would typically include processing CRC bits or using another error detection mechanism. When the Turbo code word is correctly decoded at Step 904 (Step 804), operation proceeds to step 906 (Step 906). However, if the Turbo code word is not correctly decoded at Step 906 (or Step 806), operation ends.

According to one aspect of the operations 914 and 916 of FIG. 9, the decoded MAC-HS HDR, the extracted MAC-D HDRs, the extracted RLC PDU HDRs the RLC PDU payloads are written to at least one word-aligned memory. These operations will be subsequently described with reference to FIGS. 10-14. Generally, by writing the decoded MAC-HS HDR, the extracted MAC-D HDRs, the extracted RLC PDU HDRs, and the RLC PDU payloads to word-align memory, no subsequent bit level processing is required by a general purpose processor or accelerator module of the baseband processing module.

According to another aspect of the present invention, the operation of Step 914 of writing the decoded MAC-HS HDR, the extracted MAC-D HDRs, and the extracted RLC PDU HDRs to memory includes writing the decoded MAC-HS HDR, the extracted MAC-D HDR, and the extracted RLC PDU HDRs to cacheable memory. Further, the operation of Step 916 may include writing the RLC PDU payloads to non-cacheable memory. For example, referring back to FIG. 3, cacheable memory 306 may reside within the baseband processing module integrated circuit while non-cacheable memory 234 may reside off chip. However, the example of FIG. 3 is just one example of structure that could be employed according to this aspect of the present invention. These aspects will further be described with reference to FIG. 14 subsequently herein.

The operation of Step 914 may include writing the decoded MAC-HS HDR, the extracted MAC-D PDU HDRs, and the extracted RLC PDU HDRs to a first memory subdivision and step 916 may include writing the extracted RLC PDU headers to a second memory subdivision. An example of this operation will be described with reference to FIG. 12.

Figure 10:
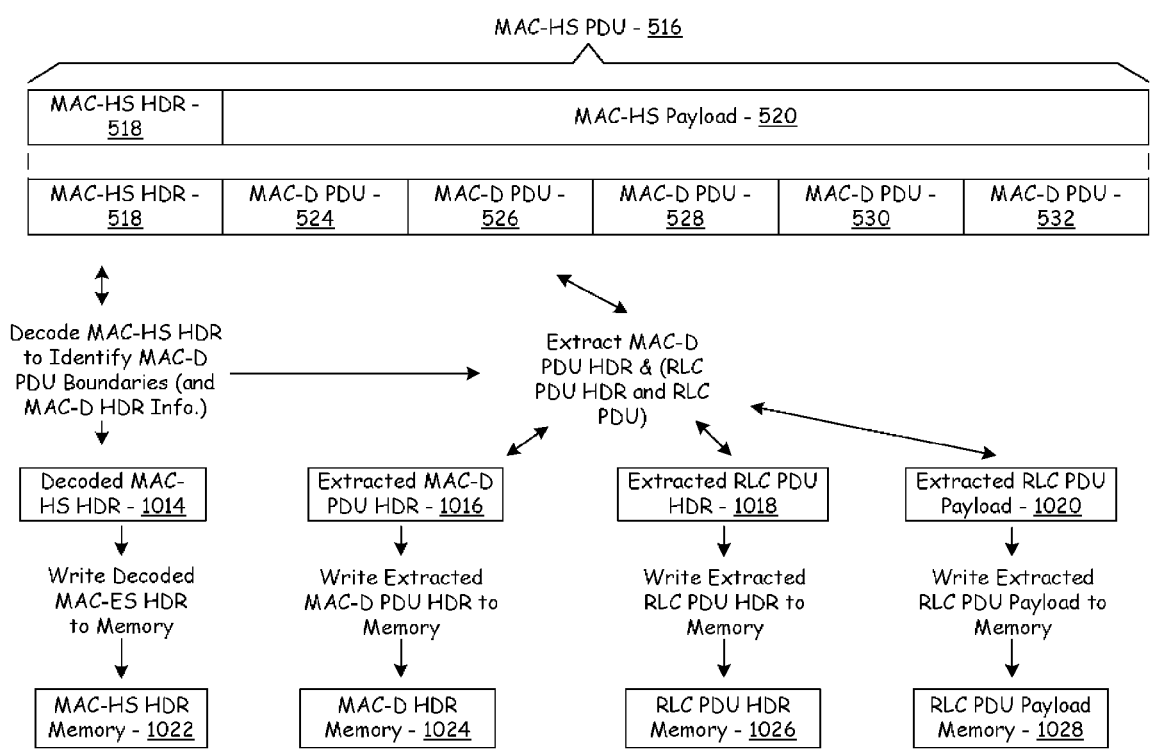
FIG. 10 is a block diagram illustrating one or more operations of FIGS. 7, 8 and/or 9 according to embodiments of the present invention.

FIG. 10 is a block diagram illustrating one or more operations of FIGS. 7, 8 and/or 9 according to embodiments of the present invention. As has been previously described, the MAC-HS PDU 516 includes a MAC-HS HDR 518 and a MAC-HS payload 520. Each Turbo code word operated on by the Turbo decoding module of the present invention may include a portion of a MAC-HS PDU, a single MAC-HS PDU, or a plurality of MAC-HS PDUs. The example of FIG. 10 considers operations of the Turbo decoding module on a single MAC-HS PDU 516 produced after a successful Turbo decoding operation. However, the reader should appreciate that other embodiments and operations according to the present invention may include the decoding of and operation upon a Turbo code word that includes more than one MAC-HS packet. Further, the reader should appreciate that the description of FIG. 10 applies to a situation in which multiple decoded Turbo code words are combined to form the single MAC-HS PDU 516.

Referring to all of FIGS. 7-10, after the Turbo decoding module decodes a Turbo code word, it performs error checking on MAC-HS PDU 516. In mode 1, the Turbo decoding module simply writes the decoded Turbo code word to memory when correctly decoded. Thus, the MAC-HS PDU 516 is simply written into memory in a bit format with no processing of the MAC-HS PDU 516.

In mode 2, the Turbo decoding module separates the MAC-HS PDU HDR 518 from the MAC-HS payload 520 and writes them to separate memory. Separation of the MAC-HS HDR 518 from the MAC-HS payload 520 is performed by the Turbo decoding module based upon the content of the MAC-HS HDR 518.

In modes 3, and 4, the Turbo decoding module further operates upon the MAC-HS PDU 516 by decoding the previously separated MAC-HS HDR 518. In mode 3 operation, the Turbo decoding module then writes the decoded MAC-HS HDR 1014 to MAC-HS HDR memory 1022 in a word-aligned format and writes the MAC-D payload 520 and the extracted MAC-D HDR if present to memory in a word-aligned format.

In mode 4, the Turbo decoding module determines the MAC-D PDU 524, 526, 528, 530, and 532 boundaries based upon the decoded MAC-HS HDR 1014. The Turbo decoding module also extracts the plurality of MAC-D PDUs 524, 526, 528, 530, and 532 from the MAC-HS payload 520. Then, the Turbo decoding module extracts the MAC-D HDRs, if present. These operations result in a plurality of extracted MAC-D HDRs 1016. The Turbo decoding module writes these extracted MAC-D HDRs to MAC-D HDR memory 1024 in a word-aligned format. The Turbo decoding module separates the RLC PDU HDRs and the RLC PDU payloads to produce RLC PDU HDRs 1018 and RLC PDU payloads 1020. The Turbo decoding module writes the RLC PDU HDRs 1018 to RLC PDU HDR memory 1026 and writes the RLC PDU payloads 1020 to RLC PDU payload memory 1028. Each of the MAC-HS HDR memory 1022, the MAC-D HDR memory 1024, the RLC PDU HDR memory 1026, and the RLC PDU payload memory 1028 stores corresponding data in a word-aligned format.

Figure 11A:
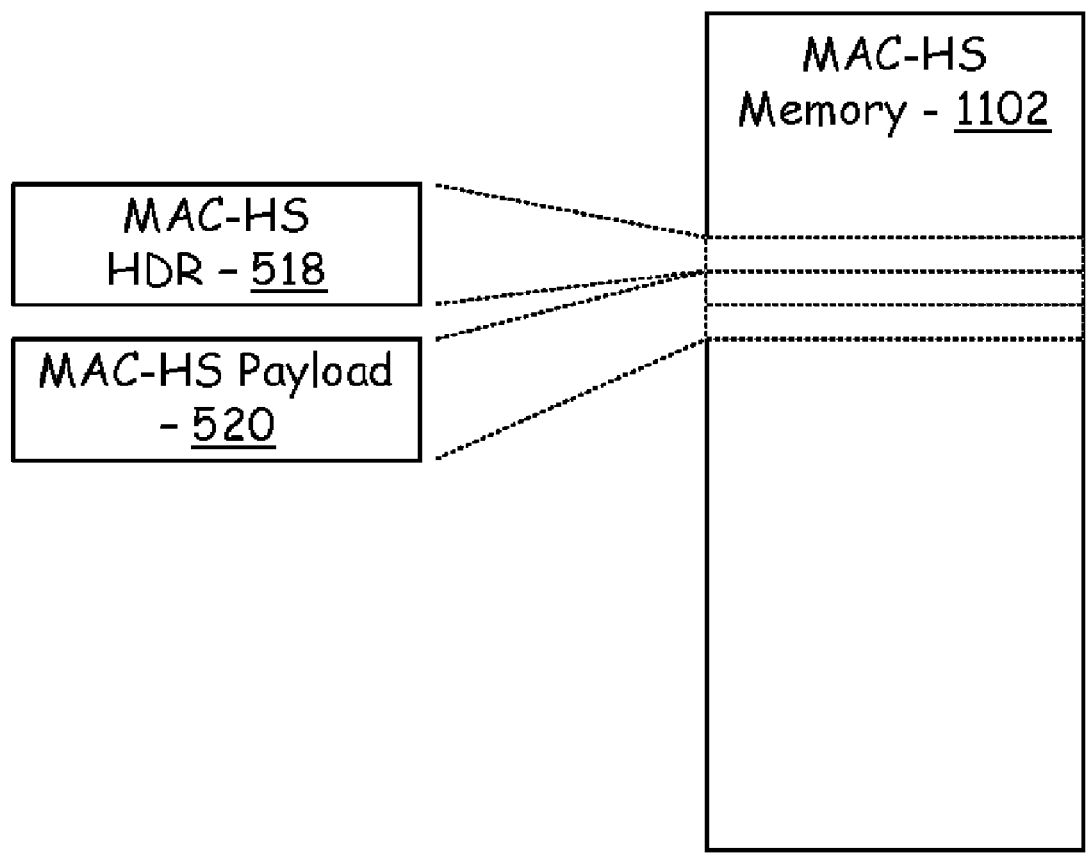
FIG. 11A is a block diagram illustrating an embodiment for writing MAC-HS packet headers and MAC-HS Payloads to memory according to the present invention.

FIG. 11A is a block diagram illustrating an embodiment for writing MAC-HS packet headers and MAC-HS Payloads to memory according to the present invention. FIG. 11A considers mode 2 operations as described above with reference to FIGS. 7 and 10. According to this embodiment, a Turbo decoding module separates the MAC-HS HDR 518 from the corresponding MAC-HS payload 520. Then, the Turbo decoding module writes these components to MAC-HS memory 1102 in a word-aligned format. According to one particular embodiment of the present invention, the MAC-HS memory 1102 is a 32 bit memory. Each of the MAC-HS HDR 518 and the MAC-HS payload 520 is written in a word aligned format, as is illustrated. However, due to variations in lengths of these data elements, some they may occupy differing numbers of the 32 bit words. In all cases, each of these components will be written to separate word(s) in memory in a word-aligned format.

Figure 11B:
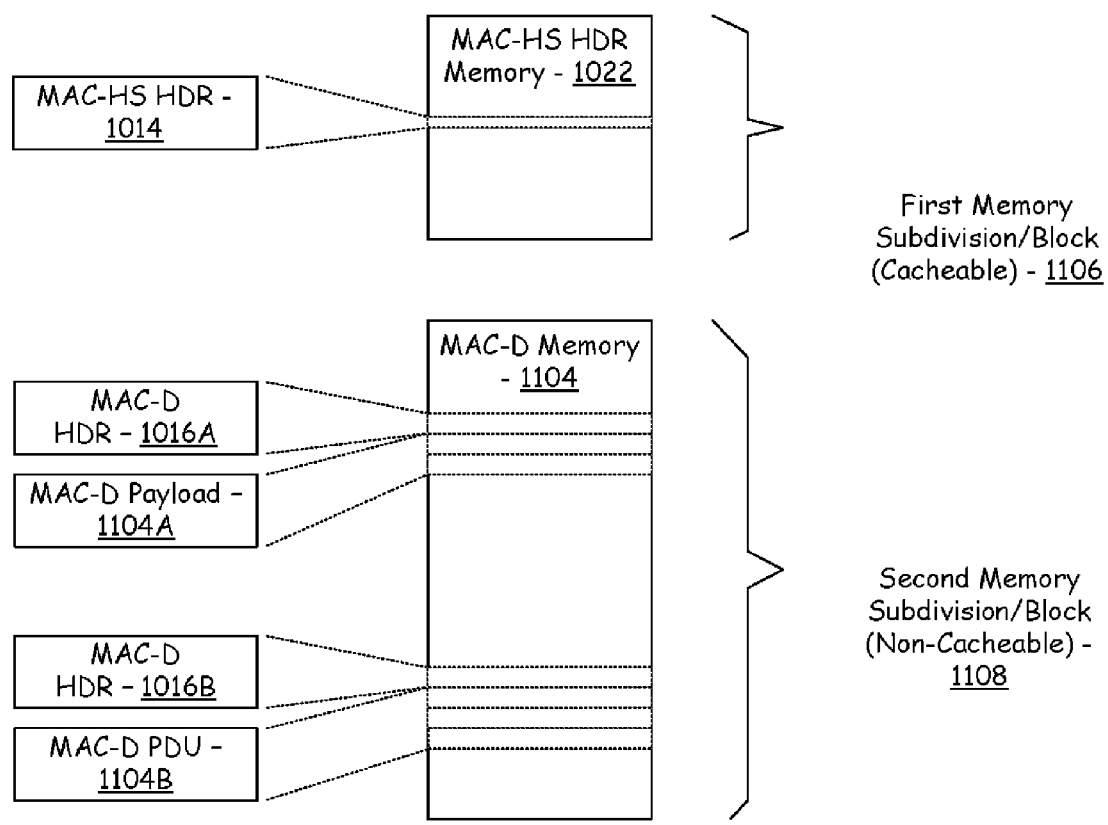
FIG. 11B is a block diagram illustrating an embodiment for writing decoded MAC-HS packet headers and MAC-D PDUs to memory according to the present invention.

FIG. 11B is a block diagram illustrating an embodiment for writing decoded MAC-HS packet headers and MAC-D PDUs to memory according to the present invention. These operations correspond to mode 3 as previously described with reference to FIGS. 8 and 10. With the embodiment of FIG. 11B, the MAC-HS HDR memory 1022 corresponds to a first memory subdivision/block 1106. Further, MAC-D memory 1104 corresponds to a second memory subdivision/block 1108. MAC-HS HDRs 1014 are written to MAC-HS HDR memory 1022 in a word-aligned format while and MAC-D HDRs 1016A and 1016B and also MAC-D payloads 1104A and 1104B are written to MAC-D memory 1104 in a word-aligned format. Each of MAC-D HDRs 1016A and 1016B is four bits in length and occupies a single 32 bit word.

According to one aspect of this structure, the first memory subdivision/block 1106 is cacheable while the second memory subdivision/block 1108 is non-cacheable. In another embodiment, the MAC-D HDRs 1016A and 1016B may be written to cacheable memory in the first memory subdivision/block 1106. Various processors/processing modules/hardware accelerators may all access the MAC-HS and MAC-D HDRs in cacheable memory. Because multiple of these processing resources may retrieve and process these HDRs at any give time, by making the first memory subdivision block 1102 cacheable, processing of these HDRs may be expeditiously performed without compromising data integrity. Referring again to FIG. 3, according to one aspect of the memory structure of FIG. 11B, the first memory subdivision block 1106 corresponds to memory 306, which may be cacheable, while the second memory subdivision block 1108 corresponds to memory 234, which may be non-cacheable.

FIG. 12 is a block diagram illustrating an embodiment for writing decoded MAC-HS headers, extracted MAC-D headers, extracted RLC PDU headers, and the RLC PDU payloads to memory according to the present invention. With the alternate memory construct of FIG. 12, the MAC-HS HDR memory 1022, the MAC-D HDR memory 1024, and the RLC PDU HDR memory 1026 correspond to a first memory subdivision/block 1202 while the RLC PDU payload memory 1028 corresponds to a second memory subdivision/block 1204. In such case, operation according to the present invention includes the Turbo decoding module writing the decoded MAC-HS HDR 1024, the extracted MAC-D HDRs 1016, and the extracted RLC PDU HDRs 1018 to the first memory subdivision/block 1202 and writing the RLC PDU payloads 1020 to the second memory subdivision block 1204. According to aspects of the present invention, both the first memory subdivision/block and the second memory subdivision block 1204 are word-aligned and cacheable.

Referring to FIG. 3 and to FIG. 12, the first memory subdivision block 1202 may correspond to memory 306, which is cacheable and accessible by the various hardware accelerators of the baseband processing module 222. Further, according to this aspect of the present invention, the second memory subdivision/block 1204 corresponds to off-chip memory 234. With this construct, the off-chip memory 234 serving as the second memory subdivision block 1204 is non-cacheable.

Figure 13:
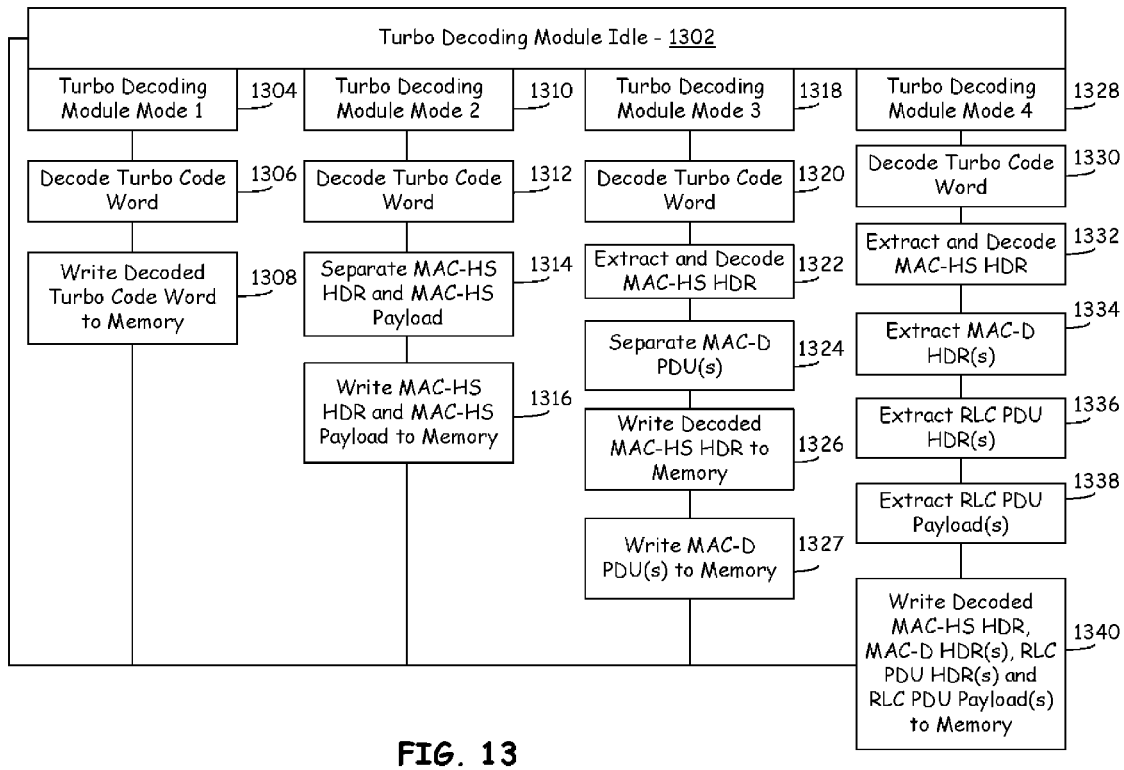
FIG. 13 is a flow chart illustrating multiple modes of operation of a Turbo decoding module according to one or more embodiments of the present invention.

FIG. 13 is a flow chart illustrating multiple modes of operation of a Turbo decoding module according to one or more embodiments of the present invention. The mode in which the Turbo decoding module operates may be set by a system operator, a user, or may be dynamically adjusted based upon the other processing requirements and operational considerations of the wireless. Operation of the Turbo decoding module commences and resides in an idle operation (Step 1302). The operations of Step 1302 include processing operations of Turbo decoding module not specifically described with reference to FIG. 13.

From Step 1302, the Turbo decoding module may move into any of four operating modes 1304, 1310, 1318, and 1328. Referring particularly to a first operating mode (mode 1) of Step 1304, the Turbo decoding module retrieves or forms a Turbo code word. The Turbo decoding module may construct a Turbo code word from plurality of IR samples that are retrieved from memory. Alternately, the Turbo decoding module may simply receive or retrieve a Turbo code word. Consistent with the operations of the first operational mode of the Turbo decoding module, the Turbo decoding module decodes the Turbo code word (Step 1306). The Turbo decoding module then performs error detection on the decoded Turbo code word to determine whether the Turbo code word has been decoded error free. When the Turbo code word has been decoded error free, the Turbo decoding module writes the decoded Turbo code word to memory (Step 1308). Then, according to the operation of mode 1 of the Turbo decoding module, operation returns to Step 1302.

In the second operational mode (Step 1310), mode 2, the turbo decoded module also decodes the Turbo code word (Step 1312). When the Turbo code word is correctly decoded by the Turbo decoding module, the Turbo decoding module separates the MAC-HS HDR from the MAC-HS payload of a MAC-HS PDU carried by the decoded Turbo code word (Step 1314). Separating the MAC-HS HDR from the MAC-HS payload may be based upon a known construct of the MAC-HS PDU. Operation continues with the Turbo decoding module writing the MAC-HS HDR and MAC-HS payload to separate memory locations (Step 1316). Both the MAC-HS HDR and the MAC-HS payload are written in a 32-bit word aligned format. From Step 1316, operation returns to Step 1302.

In the third operational mode of the Turbo decoding module (Step 1318), mode 3, operation includes decoding a Turbo code word (Step 1320). Should the Turbo code be incorrectly decoded, operation returns to Step 1302. However, if the Turbo code word is successfully decoded at Step 1320, the Turbo decoding module separates the MAC-HS PDU into MAC-HS HDR and MAC-HS payload and decodes the MAC-HS HDR to produce a decoded MAC HDR (Step 1322). The Turbo decoding module, based upon information contained in the decoded MAC-HS HDR, separates a plurality of MAC-D PDUs carried by the MAC-HS payload (Step 1324). The Turbo decoding module then writes the decoded MAC-HS HDR to memory (Step 1326) and writes the MAC-D PDU(s) to memory (Step 1327). The MAC-HS HDR and the MAC-D PDU(s) may be written in separate memories. Steps 1326 and 1327 would typically include writing the decoded MAC-HS HDR and the MAC-D PDU(s) in a word-aligned format. Operation returns from Step 1326 to Step 1302.

Finally, in a fourth operational mode according to the present invention (Step 1328), mode 4, the Turbo decoding module decodes the Turbo code word (Step 1330). If the Turbo code word is incorrectly decoded, operation returns to Step 1302. However, if the Turbo code word is correctly decoded at Step 1330, operation continues with the Turbo decoding module extracting the MAC-HS HDR from the MAC-HS PDU and decoding the MAC-HS HDR (Step 1332). The operation of Step 1332 includes the Turbo decoding module determining boundaries of a plurality of MAC-D PDUs and which, if any, of the MAC-D PDUs include MAC-D HDRs. Operation further continues with the Turbo decoding module extracting one or more MAC-D HDRs (Step 1334). Based upon decoding of the MAC-HS HDR, the Turbo decoding module also determines the boundaries of a plurality of RLC PDUs carried by the MAC-D PDU payloads. Based on the MAC-D headers if present or the MAC-HS header, the Turbo decoding module determines the boundaries of both RLC PDU HDRs and RLC PDU payloads of each of the RLC PDUs whose boundaries were determined from the decoded MAC-HS PDU HDR at Step 1332.

The turbo decoded module then extracts each of the RLC PDU HDRs (Step 1336). Then, the Turbo decoding module separates each of the RLC PDU payloads to produce word-aligned RLC PDU payloads (Step 1338). Finally, the Turbo decoding module writes the decoded MAC-HS HDR, the extracted MAC-D HDRs, the extracted RLC PDU HDRs, and the separated RLC PDU payloads to memory (Step 1340). As was previously described with reference to FIGS. 9, 10, and 12, in writing decoded the MAC-HS HDR, the MAC-D HDRs, the extracted RLC PDU HDRs, and the extracted RLC PDU payloads, the Turbo decoding module may write this data in a word-align format. Further, according to another aspect of the present invention, the MAC-HS HDR, the MAC-D HDRs, and the RLC PDU HDRs may be written to cacheable memory. From Step 1340, operation returns to Step 1302.

Figure 14:
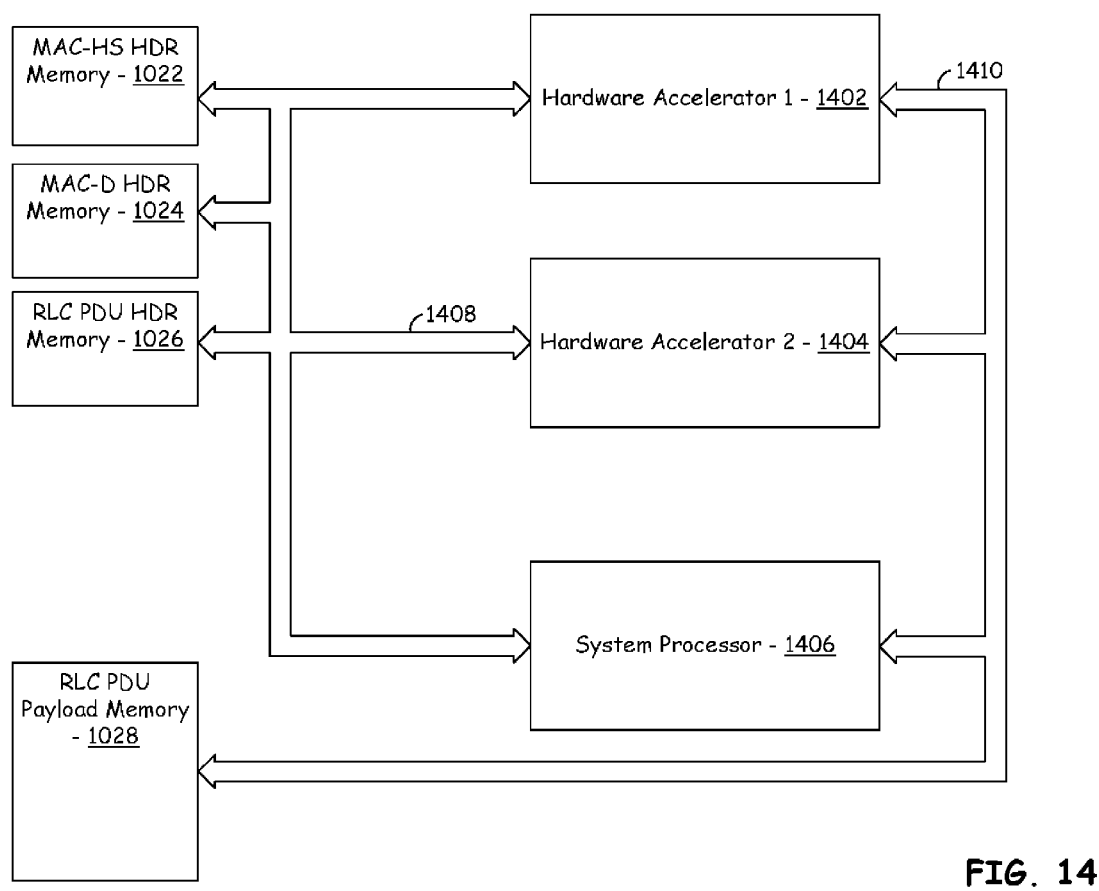
FIG. 14 is a block diagram illustrating the manner in which multiple hardware accelerators operate upon MAC-HS packet headers, MAC-D headers, RLC PDU headers and RLC PDU payloads stored by a Turbo decoding module according to one or more embodiments of the present invention.

FIG. 14 is a block diagram illustrating the manner in which multiple hardware accelerators operate upon MAC-HS HDRs, MAC-D HDRs, RLC PDU HDRs, and RLC PDU payloads stored by a Turbo decoding module according to one or more embodiments of the present invention. Shown in FIG. 14 is one example of the structure of a baseband processing module and its interface to the MAC-HS HDR memory 1022, the MAC-D HDR memory 1024, the RLC PDU HDR memory 1026, and the RLC PDU payload memory 1028. According to the teachings of FIG. 14, the baseband processing module includes, in addition to the Turbo decoding module, hardware accelerators 1402 and 1404 and a system processor 1406. Referring to both FIGS. 3 and 14, either of the hardware accelerators 1402 or 1404 may correspond to other modules of baseband processing module 222 besides the Turbo decoding module. System processor 1406 of FIG. 14 may correspond to processor 302 of baseband processing module 222 of FIG. 3.

As was previously described, the MAC-HS HDR memory 1022, the MAC-D HDR memory 1024, and the RLC PDU HDR memory 1026 may correspond to memory 306 of baseband processing module 222. Further, the RLC PDU payload memory 1028 may correspond to the off-chip memory 234 of the wireless terminal. In such case, according to one aspect of the present invention, the MAC-HS HDR memory 1022, the MAC-D HDR memory 1024, and the RLC PDU HDR memory 1026 are cacheable and may be accessed by a cacheable memory path 1408 by hardware accelerators 1402 and 1404 and system processor 1406. Further, RLC PDU payload memory 1028 is non-cacheable and is accessed by a different memory access path 1410 by hardware accelerators 1402 and 1404 and system processor 1406.

While the memory paths 1408 and 1410 of FIG. 14 are shown to be separate memory paths, the reader should appreciate that the memory paths 1408 and 1410 are shown to be separate to distinguish the cacheable and non-cacheable aspects of the memory structures described with reference to FIG. 14. In other embodiments, the memory paths 1408 and 1410 may coincide without departing from the principles of the present invention with relating to cacheable and non-cacheable memory components.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The invention claimed is:

1. A method for performing Turbo decoding operations in a Radio Frequency (RF) transceiver of a wireless terminal, the method comprising:
   receiving an RX RF signal;
   converting the RX RF signal to a baseband RX signal;
   producing a Turbo code word from the baseband RX signal;
   a Turbo decoding module of the RF transceiver:
      receiving the Turbo code word;
      decoding the Turbo code word to a yield a Media Access Control (MAC) packet having a MAC packet header and a MAC packet payload;
      decoding the MAC packet header to determine boundaries of a plurality of Radio Link Control (RLC) Packet Data Units (PDUs) of the MAC packet payload;
      extracting a corresponding plurality of RLC PDU headers and a corresponding plurality of RLC PDU payloads from the RLC PDUs; and
      writing the decoded MAC packet header, the extracted RLC PDU headers, and the decoded RLC PDU payloads to memory.

2. The method of claim 1, wherein extracting a corresponding plurality of RLC PDU headers and a corresponding plurality of RLC PDU payloads from the RLC PDUs further comprises extracting at least one secondary MAC packet header associated with one of the RLC PDUs.

3. The method of claim 1, wherein the decoded MAC packet header, the extracted RLC PDU headers, and the extracted RLC PDU payloads are written to at least one memory in a word-aligned format.

4. The method of claim 1, wherein writing the decoded MAC packet header, the extracted RLC PDU headers, and the separated RLC PDU payloads to memory comprises:
   writing the MAC packet header and the extracted RLC PDU headers to cacheable memory; and
   writing the RLC PDU payloads to non-cacheable memory.

5. The method of claim 1, wherein writing the decoded MAC packet header, the extracted RLC PDU headers, and the extracted RLC PDU payloads to memory comprises:
   writing the decoded MAC packet header to a first memory subdivision;
   writing the extracted RLC PDU headers to a second memory subdivision; and
   writing the extracted RLC PDU payloads to a third memory subdivision.

6. The method of claim 1, wherein writing the decoded MAC packet header, the extracted RLC PDU headers, and the extracted RLC PDU payloads units to memory comprises:
   writing the decoded MAC packet header and the extracted RLC PDU headers to a first memory subdivision; and
   writing the extracted RLC PDU payloads to a second memory subdivision.

7. A method for performing Turbo decoding operations in a Radio Frequency (RF) transceiver of a wireless terminal, the method comprising:
   receiving an RX RF signal;
   converting the RX RF signal to a baseband RX signal;
   producing a Turbo code word from the baseband RX signal;
   a Turbo decoding module of the RF transceiver:
      receiving the Turbo code word;
      decoding the Turbo code word to a yield a Media Access Control (MAC) Packet Data Unit (PDU) having a MAC PDU header and a MAC PDU payload that carries a plurality of MAC-D PDUs;
      decoding the MAC PDU header to determine boundaries of the plurality of MAC-D PDUs, each MAC-D PDU carrying at least one Radio Link Control (RLC) Packet Data Unit (PDU) and the MAC-D PDUs may carry a MAC-D PDU header;
      when present, extracting the MAC-D header;
      extracting at least one corresponding RLC PDU header and at least one corresponding RLC PDU payload from each of the at least one RLC PDU; and
      writing the decoded MAC-HS header, the extracted RLC PDU header(s), and the extracted RLC PDU payload(s) to memory.

8. The method of claim 7, further comprising writing the extracted MAC-D headers if present to memory.

9. The method of claim 8, wherein the decoded MAC PDU header, the extracted MAC-D header, the extracted RLC PDU headers, and the extracted RLC PDU payloads are written to at least one word-aligned memory.

10. The method of claim 7, wherein the decoded MAC PDU header, the extracted RLC PDU headers, and the extracted RLC PDU payloads are written to at least one word-aligned memory.

11. The method of claim 7, wherein writing the decoded MAC PDU header, the extracted RLC PDU headers, and the extracted RLC PDU payloads to memory comprises:
   writing the decoded MAC PDU header and the extracted RLC PDU headers to cacheable memory; and
   writing the extracted RLC PDU payloads to non-cacheable memory.

12. The method of claim 7, wherein writing the decoded MAC PDU header, the extracted RLC PDU headers, and the extracted RLC PDU payloads to memory comprises:
   writing the decoded MAC PDU header to a first memory subdivision;
   writing the extracted RLC PDU headers to a second memory subdivision; and
   writing the extracted RLC PDU payloads to a third memory subdivision.

13. The method of claim 7, wherein writing the decoded MAC packet header, the extracted RLC PDU headers, and the extracted RLC PDU payloads to memory comprises:
   writing the decoded MAC packet header and the extracted RLC PDU headers to a first memory subdivision; and
   writing the extracted RLC PDU payloads to a second memory subdivision.

14. A baseband processing module for use within a Radio Frequency (RF) transceiver, the baseband processing module comprising:
   a downlink/uplink interface operable to receive outbound data from and to provide inbound data to coupled host processing components;
   TX processing components communicatively coupled to a RF front end of the RF transceiver and to the downlink/uplink interface and operable to receive the outbound data from the downlink/uplink interface, to process the outbound data to produce a baseband TX signal, and to output the baseband TX signal to the RF front end of the RF transceiver;
   RX processing components coupled to the RF front end and operable to receive a baseband RX signal from the RF front end, to produce a set of IR samples from the baseband RX signal, and to transfer the set of IR samples to a memory; and
   a Turbo decoding module communicatively coupled to the processor, to the memory, and to the downlink uplink interface, the Turbo decoding module operable to:

form a Turbo code word from a set of IR samples retrieved from the memory;
decode the Turbo code word to a yield a Media Access Control (MAC) packet having a MAC packet header and a MAC packet payload;
decode the MAC packet header to determine boundaries of a plurality of Radio Link Control (RLC) Packet Data Units (PDUs) of the MAC packet payload;
extract a corresponding plurality of RLC PDU headers and a corresponding plurality of RLC PDU payloads from the RLC PDUs; and
write the decoded MAC packet header, the extracted RLC PDU headers, and the extracted RLC PDU payloads to memory.

15. The baseband processing module of claim 14, wherein in extracting the corresponding plurality of RLC PDU headers and the corresponding plurality of RLC PDU payloads from the RLC PDUs the Turbo decoding module is operable to extract at least one secondary MAC packet header associated with one of the RLC PDUs.

16. The baseband processing module of claim 14, wherein the Turbo decoding module is further operable to write the decoded MAC packet header, the extracted RLC headers, and the extracted RLC packet data units to at least one word-aligned memory.

17. The baseband processing module of claim 14, wherein:
the memory comprises cacheable memory and non-cacheable memory; and
in writing the decoded MAC packet header, the extracted RLC PDU headers, and the extracted RLC PDU payloads to memory, the Turbo decoding module is operable to:
write the decoded MAC packet header and the extracted RLC PDU headers to cacheable memory; and
write the extracted RLC PDU payloads to non-cacheable memory.

18. The baseband processing module of claim 14, wherein in writing the decoded MAC packet header, the extracted RLC headers, and the extracted RLC packet data units to memory, the Turbo decoding module is operable to:
write the decoded MAC packet header to a first memory subdivision;
write the extracted RLC headers to a second memory subdivision; and
write the extracted RLC packet data units to a third memory subdivision.

19. The baseband processing module of claim 14, wherein in writing the decoded MAC packet header, the extracted RLC headers, and the extracted RLC packet data units to memory, the Turbo decoding module is operable to:
write the decoded MAC packet header and the extracted RLC headers to a first memory subdivision; and
write the extracted RLC packet data units to a second memory subdivision.

20. A method for performing Turbo decoding operations upon a Turbo code word in a Radio Frequency (RF) transceiver of a wireless terminal, the method comprising:
decoding the Turbo code word to a yield a Media Access Control (MAC) packet having a MAC packet header and a MAC packet payload;
in a first operational mode, writing the decoded Turbo code word to memory;
in a second operational mode:
writing the MAC packet header to a corresponding memory location; and
writing the MAC packet payload to a corresponding memory location;
in a third operational mode:
decoding the MAC packet header;
extracting a plurality of secondary MAC packets from the MAC packet payload;
writing the MAC packet header to a corresponding memory location; and
writing the plurality of secondary MAC packet payloads to corresponding memory locations; and
in a fourth operational mode:
decoding the MAC packet header to determine boundaries of a plurality of RLC PDUs of the MAC packet payload;
extracting a corresponding plurality of RLC PDU headers and a corresponding plurality of RLC PDU payloads from the plurality of RLC PDUs; and
writing the decoded MAC packet header to a corresponding memory location;
writing the extracted RLC PDU headers to corresponding memory locations; and
writing the extracted RLC PDU payloads to corresponding memory locations.

21. The method of claim 20, wherein, in the third operational mode the MAC packet header is written to word-aligned memory.

22. The method of claim 20, further comprising, in the fourth operational mode, extracting at least one secondary MAC packet header associated with one of the RLC PDUs.

23. The method of claim 20, wherein, in the fourth operational mode:
the decoded MAC packet header and the extracted RLC PDU headers are written to cacheable memory; and
the extracted RLC PDU payloads are written to non-cacheable memory.

24. The method of claim 20, wherein, in the fourth operational mode, the decoded MAC packet header, the extracted RLC headers, and the extracted RLC packet data units are written to word-aligned memory.

25. The method of claim 20, wherein, in the fourth operational mode:
the decoded MAC packet header and the extracted RLC PDU headers are written to cacheable memory; and
the extracted RLC PDU payloads are written to non-cacheable memory.

26. The method of claim 20, wherein, in the fourth operational mode:
the decoded MAC packet header is written to a first memory subdivision;
the extracted RLC PDU headers are written to a second memory subdivision; and
the extracted RLC PDU payloads are written to a third memory subdivision.

27. A baseband processing module for use within a Radio Frequency (RF) transceiver, the baseband processing module comprising:
a downlink/uplink interface operable to receive outbound data from and to provide inbound data to coupled host processing components;
TX processing components communicatively coupled to a RF front end of the RF transceiver and to the downlink/uplink interface and operable to receive the outbound data from the downlink/uplink interface, to process the outbound data to produce a baseband TX signal, and to output the baseband TX signal to the RF front end of the RF transceiver;
RX processing components coupled to the RF front end and operable to receive a baseband RX signal from the RF front end, to produce a set of IR samples from the baseband RX signal, and to transfer the set of IR samples to a memory; and a Turbo decoding module communicatively coupled to the processor, to the memory, and to the downlink uplink interface, the Turbo decoding module operable to:

decode the Turbo code word to a yield a Media Access Control (MAC) packet having a MAC packet header and a MAC packet payload;

in a first operational mode, write the decoded Turbo code word to memory;

in a second operational mode:
write the MAC packet header to a corresponding memory location; and
write the MAC packet payload to a corresponding memory location; and in a third operational mode:
decode the MAC packet header to determine boundaries of a plurality of Radio Link Control (RLC) Packet Data Units (PDUs) of the MAC packet payload;
write the decoded MAC packet header to a corresponding memory location; and
write the plurality of RLC PDUs to corresponding memory locations.

28. The baseband processing module of claim 27, wherein, in the third operational mode the Turbo decoding module writes the decoded MAC packet header to word-aligned memory.

29. The baseband processing module of claim 27, wherein, in the third operational mode the Turbo decoding module is operable to:
write the decoded MAC packet header to cacheable memory; and
write the RLC PDUs to non-cacheable memory.

30. The baseband processing module of claim 27, wherein, in a fourth operational mode, the Turbo decoding module is operable to:
decode the MAC packet header to determine boundaries of the plurality of RLC PDUs of the MAC packet payload;
extract a corresponding plurality of RLC PDU headers and a corresponding plurality of RLC PDU payloads from the RLC PDUs; and
write the decoded MAC packet header to a corresponding memory location;
write the extracted RLC PDU headers to corresponding memory locations; and
write the extracted RLC PDU payloads to corresponding memory locations.

31. The baseband processing module of claim 30, wherein, in the fourth operational mode, the Turbo decoding module writes the decoded MAC packet header, the extracted RLC headers, and the extracted RLC packet data units to word-aligned memory.

32. The baseband processing module of claim 30, wherein, in the fourth operational mode the Turbo decoding module:
writes the decoded MAC packet header and the extracted RLC PDU headers to cacheable memory; and
writes the extracted RLC PDU payloads to non-cacheable memory.

33. The baseband processing module of claim 30, wherein, in the fourth operational mode the Turbo decoding module:
writes the decoded MAC packet header to a first memory subdivision;
writes the extracted RLC PDU headers to a second memory subdivision; and
writes the extracted RLC PDU payload to a third memory subdivision.

\* \* \* \* \*

UNITED STATES PATENT AND TRADEMARK OFFICE
CERTIFICATE OF CORRECTION

PATENT NO. : 7,586,931 B2  Page 1 of 1
APPLICATION NO. : 11/779988
DATED : September 8, 2009
INVENTOR(S) : Xiaoxin Qui et al.

It is certified that error appears in the above-identified patent and that said Letters Patent is hereby corrected as shown below:

Column 20, line 66, in Claim 14: replace "downlink uplink" with --downlink/uplink--.

Column 23, line 5, in Claim 27: replace "downlink uplink" with --downlink/uplink--.

Signed and Sealed this

Twenty-fourth Day of November, 2009

David J. Kappos
*Director of the United States Patent and Trademark Office*